US010455328B2

(12) United States Patent
Moova et al.

(10) Patent No.: US 10,455,328 B2
(45) Date of Patent: Oct. 22, 2019

(54) ADJUSTABLE MICROPHONE HEADSET

(71) Applicant: Hand Held Products, Inc., Fort Mill, SC (US)

(72) Inventors: Nageshwara Rao Moova, Hyderabad (IN); Rimi Raina, Delhi (IN); Nikhil Sharma, Gurgaon (IN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 16/034,637

(22) Filed: Jul. 13, 2018

(65) Prior Publication Data
US 2019/0020952 A1    Jan. 17, 2019

(30) Foreign Application Priority Data

Jul. 14, 2017  (IN) .............................. 201741025087

(51) Int. Cl.
*H04R 3/00* (2006.01)
*H04R 5/027* (2006.01)
(Continued)

(52) U.S. Cl.
CPC ............. *H04R 5/027* (2013.01); *G06F 3/167* (2013.01); *G10L 15/01* (2013.01); *H04R 1/08* (2013.01); *H04R 1/1041* (2013.01); *H04R 1/1058* (2013.01); *H04R 3/00* (2013.01); *H04R 5/033* (2013.01); *H04R 29/00* (2013.01);
(Continued)

(58) Field of Classification Search
CPC ........ H04R 5/027; H04R 1/08; H04R 1/1041; H04R 1/1058; H04R 3/00; H04R 5/033; H04R 29/00; H04R 1/1083; H04R 2201/025; H04R 2201/107; G06F 3/167;
(Continued)

(56) References Cited

U.S. PATENT DOCUMENTS

| 6,405,170 B1 | 6/2002 | Phillips et al. |
| 7,346,175 B2 | 3/2008 | Hui et al. |

(Continued)

FOREIGN PATENT DOCUMENTS

| EP | 2680607 A1 | 1/2014 |
| EP | 2822292 A1 | 1/2015 |
| WO | 2001/078443 A2 | 10/2001 |

OTHER PUBLICATIONS

European Search Report for corresponding European application 181835513 dated Dec. 5, 2018, 5 pages.

*Primary Examiner* — Norman Yu
(74) *Attorney, Agent, or Firm* — Alston & Bird LLP

(57) ABSTRACT

Example embodiments relating to the adjustment of a microphone attached to a headset are provided. The adjustable headset detects a microphone attached to the headset at a first position and receives one or more speech signal inputs from a user. The headset calculates a feedback parameter which includes a confidence parameter, a vocabulary assistance parameter, and a node exit attempt parameter. The headset determines a pass state in an instance in which the feedback parameter satisfies a feedback threshold, to maintain the microphone at the first position. The headset determines a fail state in an instance in which the feedback parameter fails to satisfy a feedback threshold, to cause a stepper motor to move the microphone from the first position to a second position relative the user.

20 Claims, 8 Drawing Sheets

(51) Int. Cl.
*H04R 1/08* (2006.01)
*G06F 3/16* (2006.01)
*G10L 15/01* (2013.01)
*H04R 29/00* (2006.01)
*H04R 5/033* (2006.01)
*H04R 1/10* (2006.01)

(52) U.S. Cl.
CPC ...... *H04R 1/1083* (2013.01); *H04R 2201/025* (2013.01); *H04R 2201/107* (2013.01)

(58) Field of Classification Search
CPC ......... G10L 15/01; G10L 15/22; G10L 15/08; G10L 15/10; G10L 2015/088
USPC .................. 381/92, 56, 26, 58, 110, 122, 91; 704/275, 231, E15.002, 251
See application file for complete search history.

(56) References Cited

U.S. PATENT DOCUMENTS

| | | | |
|---|---|---|---|
| 2006/0069557 A1 | 3/2006 | Barker et al. | |
| 2014/0278387 A1* | 9/2014 | DiGregorio | G10L 15/20 704/231 |
| 2015/0003623 A1 | 1/2015 | Rasmussen | |
| 2015/0280677 A1 | 10/2015 | Hui | |
| 2016/0125873 A1* | 5/2016 | Braho | G10L 15/07 704/239 |
| 2018/0096678 A1* | 4/2018 | Zhou | G10L 15/32 |

* cited by examiner

ADJUSTABLE MICROPHONE HEADSET

CROSS-REFERENCE TO RELATED APPLICATIONS

This application claims priority to Indian Patent Application No. 201741025087, filed Jul. 14, 2017, the content of this application is hereby incorporated by reference in its entirety.

BACKGROUND

The present disclosure relates in general to communications headsets, and, more particularly, to headsets with adjustable microphones.

Wearable and other portable communication devices, such as headsets, are widely used for executing various tasks including voice commands or voice assisted tasks in working environments. Generally, voice commands inputted via a portable communication device (e.g., a microphone headset) may be used in applications and workflows such as tracking and monitoring inventory, order picking, supply chain management, and other order fulfillment and management tasks in retail and warehouse environments. Traditionally, a headset device may be utilized for receiving voice based commands or inputs from a user (e.g., operator) associated with various corresponding tasks within the working environment. Accordingly, these headsets may include a microphone to receive voice based inputs from the operator relating to inventory count, current location, task completion notification, and the like in response to the voice commands received by the microphone.

In conventional headsets, a microphone boom extending from the headset may be used to position the microphone relative to the mouth of a user. The microphone boom may be manually adjustable in that it may be swiveled up and/or down by a user to position the microphone near the user's mouth. However, in traditional microphone headsets, the microphone may be incorrectly positioned by a user or may drift when the user moves or performs activities. Such improper positioning of the microphone may result in failure by the microphone to properly receive speech inputs from the user. Receipt of incorrect or unclear speech inputs by the microphone headset may result in required repetition of inputs by the user, a reduction in productivity of the user, a reduction of productivity for the workflow, and/or errors in workflow operations (e.g., reaching an unintended pick-up location, dispatching an incorrect shipment, or the like).

Applicant has identified a number of additional deficiencies and problems associated with conventional adjustable microphones and other associated headset systems and methods. Through applied effort, ingenuity, and innovation, many of these identified problems have been solved by developing solutions that are included in embodiments of the present invention, many examples of which are described in detail herein.

BRIEF SUMMARY

The present disclosure relates to techniques for adjusting an orientation of a microphone of a headset. A method for adjusting an orientation of a headset may include detecting a microphone attached to the headset at a first position relative to a user and receiving, by the microphone, one or more speech signal inputs from a user in the form of an utterance. The method may include calculating, by a computing device, in response to the speech signal input, a feedback parameter where the feedback parameter includes a confidence parameter defining an average recognition score of the one or more speech signal inputs that match a desired output, a vocabulary assistance parameter defining a number of times that the one or more speech signal input is recognized due to vocabulary approximation, and a node exit attempt parameter defining a number of the one or more speech signal inputs required for a user to exit a particular node in a vocabulary task map. The method may include determining, by the computing device, a pass state in an instance in which the feedback parameter satisfies a feedback threshold, to maintain the microphone at the first position, and determining, by the computing device, a fail state in an instance in which the feedback parameter fails to satisfy a feedback threshold, to cause a stepper motor to move the microphone from the first position to a second position relative to the user.

In some embodiments, a fail state may further include testing at least one of the confidence parameter is less than a confidence threshold, the vocabulary assistance parameter is greater than a vocabulary assistance threshold, or the node exit attempt parameter is greater than a node exit attempt threshold.

In some cases, the method may include generating, by the microphone, in response to receiving a speech signal input, an input gain parameter defining a decibel gain of the speech signal input, determining, by the computing device, a pass state in an instance in which the input gain parameter is greater than a minimum input gain threshold or less than a maximum input gain threshold, to maintain the microphone at the first position, and determining, by the computing device, a fail state in an instance in which the input gain parameter is less than a minimum input gain threshold or greater than a maximum input gain threshold, to cause a stepper motor to move the microphone from the first position to the second position.

In other cases, the method may include generating, by the computing device, in response to receiving a speech signal input, a repetition parameter defining a number of times that the speech signal input is received by the microphone before the speech signal input matches a desired output, determining, by the computing device, a pass state in an instance in which the repetition parameter is less than a repetition threshold, to maintain the microphone at the first position, and determining, by the computing device, a fail state in an instance in which the repetition parameter is greater than a repetition threshold, to cause a stepper motor to move the microphone from the first position to the second position.

In some other cases, the method may include detecting, by a gyroscope, a first angular position of the microphone, determining, by the computing device, a pass state in an instance in which the feedback parameter satisfies a feedback threshold, to maintain the microphone at the first angular position, and determining, by the computing device, a fail state in an instance in which the feedback parameter fails to satisfy a feedback threshold, to cause a stepper motor to move the microphone from the first angular position to the second angular position.

In some other embodiments, the method may further include causing the microphone to move to a third position relative to the user, via a stepper motor, in an instance in which the speech signal input from the user is determined, by the recognizer module, to further comprise user status change data.

In some still further embodiments, the method may include calibrating the headset such that the feedback parameter further comprises user-specific feedback data.

An adjustable headset according to an example environment is provided. The adjustable headset may include a microphone located at a first position, wherein the microphone may be configured to receive a speech signal input from a user in the form of an utterance. The adjustable headset may include a computing device, wherein the computing device may be configured to determine a pass state or a fail state of the first position of the microphone, based upon a comparison of a feedback parameter with a feedback threshold, and, if a fail state is determined, to calculate a second position of the microphone. The computing device may include a recognizer module configured to, when activated by the computing device, determine a feedback parameter, in response to the speech signal input, wherein the feedback parameter may include a confidence parameter defining an average recognition score of the speech signal inputs that match a desired output and a vocabulary assistance parameter defining a number of times that the speech signal input is recognized due to vocabulary approximation, and a workflow iterator module configured to, when activated by the computing device, modify the feedback parameter, in response to the speech signal input, to further include a node exit attempt parameter defining a number of attempts required for a user to exit a particular node in a vocabulary task map. The adjustable headset may include a stepper motor configured to move the microphone from the first position to the second position.

In some cases, the computing device may determine a fail state in an instance in which the confidence parameter is less than a confidence threshold, the vocabulary assistance parameter is greater than a vocabulary assistance threshold, or the node exit attempt parameter is greater than a node exit attempt threshold.

In other cases, the recognizer module may be further configured to, when activated by the computing device, modify the feedback parameter with an input gain parameter defining a decibel gain of the speech signal input, wherein the computing device may be configured to determine a pass state in an instance in which the input gain parameter is greater than a minimum input gain threshold or less than a maximum input gain threshold, to maintain the microphone at the first position. In such a case, the stepper motor may be configured to move the microphone from the first position to the second position in an instance in which a fail state is determine, by the computing device, by testing that the input gain parameter is less than a minimum input gain threshold or greater than a maximum input gain threshold.

In some embodiments, the recognizer module may be further configured to, when activated by the computing device, modify the feedback parameter with an repetition parameter defining a number of times that the speech signal input is received by the microphone before the speech signal input matches a desired output, wherein the stepper motor may be configured to maintain the microphone at the first angular position in an instance in which a pass state is determined, by the computing device, in which the repetition parameter satisfies a repetition threshold. In such a case, the stepper motor may be configured to move the microphone from the first position to the second position in an instance in which a fail state is determine, by the computing device, in which the repetition parameter is greater than a repetition threshold.

In some embodiments, the adjustable headset may further includes a gyroscope configured to determine a first angular position of the microphone, wherein the stepper motor may be configured to maintain the microphone at the first angular position in an instance in which a pass state is determined, by the computing device, in which the feedback parameter satisfies the feedback threshold. In such an embodiment, the stepper motor may be configured to move the microphone from the first angular position to the second angular position in an instance in which a fail state is determined, by the computing device, in which the feedback parameter fails to satisfy the feedback threshold.

In some cases, the stepper motor may be further include to move the microphone from the first position to a third position in an instance in which the speech signal input from the user is determined, by the recognizer module, to further comprise user status change data.

In other cases, the adjustable headset may further include user-specific feedback data generated by the computing device during a calibration procedure.

A computer program product including at least one non-transitory computer-readable storage medium having computer-executable program code stored therein is provided. The computer-executable program code comprising program code instructions may be configured to detect a microphone at a first position and receive a speech signal input from a user in the form of an utterance. The program code instructions may be configured to determine, in response to the speech signal input, a feedback parameter, wherein the feedback parameter includes a confidence parameter defining an average recognition score of the speech signal inputs that match a desired output, a vocabulary assistance parameter defining a number of times that the speech signal input is recognized due to vocabulary approximation, and a node exit attempt parameter defining a number of attempts required for a user to exit a particular node in a vocabulary task map. The program code instructions may be configured to determine a pass state in an instance in which the feedback parameter satisfies a feedback threshold, to maintain the microphone at the first position and determine a fail state in an instance in which the feedback parameter fails to satisfy a feedback threshold, to cause a stepper motor to move the microphone from the first position to the second position.

In some embodiments, the program code instructions may be configured to determine a fail state in an instance in which at least one of the confidence parameter is less than a confidence threshold, the vocabulary assistance parameter is greater than a vocabulary assistance threshold, or the node exit attempt parameter is greater than the node exit attempt threshold.

In other cases, the program code instructions may be configured to generate, in response to receiving a speech signal input, an input gain parameter defining a decibel gain of the speech signal input, determine, a pass state in an instance in which the input gain parameter is greater than a minimum input gain threshold or less than a maximum input gain threshold, to maintain the microphone at the first position, and determine a fail state in an instance in which the input gain parameter is less than a minimum input gain threshold or greater than a maximum input gain threshold, to cause a stepper motor to move the microphone from the first position to the second position.

In some further embodiments, the program code instruction may be configured to generate, in response to receiving a speech signal input, a repetition parameter defining a number of times that the speech signal input is received by the microphone before the speech signal input matches a desired output, determine, a pass state in an instance in which the repetition parameter is less than a repetition threshold, to maintain the microphone at the first position, and determine a fail state in an instance in which the repetition parameter is greater than a repetition threshold, to cause a stepper motor to move the microphone from the first position to the second position.

In some still further cases, the program code instruction may be configured to detect a first angular position of the microphone, determine a pass state in an instance in which the feedback parameter satisfies a feedback threshold, to maintain the microphone at the first angular position, and determine a fail state in an instance in which the feedback parameter fails to satisfy a feedback threshold, to cause a stepper motor to move the microphone from the first angular position to the second angular position.

In some embodiments, the program code instructions may be configured to move the microphone to a third position in an instance in which the speech signal input from the user is determined to further comprise user status change data.

In other embodiments, the program code instructions may be configured to calibrate the headset such that the feedback parameter further includes user-specific feedback data.

The above summary is provided merely for purposes of summarizing some example embodiments illustrating some aspects of the present invention. Accordingly, it will be appreciated that the above-described embodiments are merely examples and should not be construed to narrow the scope or spirit of the invention in any way. It will be appreciated that the scope of the invention encompasses many potential embodiments in addition to those herein summarized, some of which will be further described below.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
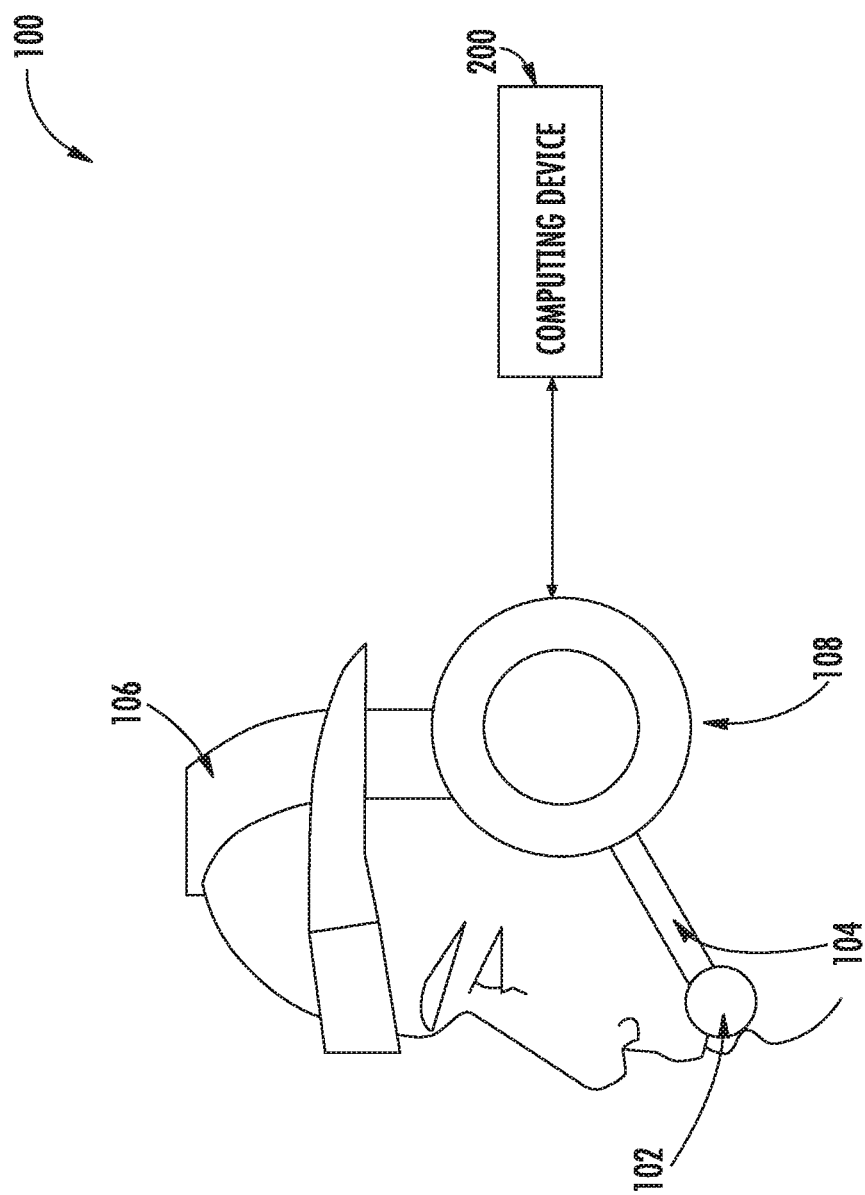
FIG. 1 shows a perspective view of an adjustable microphone headset, according to an example embodiment of the present disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the description may refer to an "apparatus," "headset," or "microphone." However, elements of the apparatus or headset described herein may be equally applicable to the claimed method and computer program product. Thus, use of any such terms should not be taken to limit the spirit and scope of embodiments of the present invention. The word "exemplary" is used herein to mean "serving as an example, instance, or illustration." Any implementation described herein as "exemplary" is not necessarily to be construed as preferred or advantageous over other implementations.

Definition of Terms

Certain terms used in connection with embodiments described herein are defined below.

As used herein, the terms "orientation," "direction," "location," "position," "angular position," and other similar terms may be used to refer to the positioning of various elements of the embodiments discussed herein. Thus, use of any such terms should not be taken to limit the spirit and scope of embodiments of the present invention. By way of example, in some embodiments, the orientation of a microphone may be adjusted via modification of the positions of a microphone boom and/or a microphone headset associated with the microphone. In some further embodiments, a gyroscope may be used to determine an angular position of the microphone and/or headband associated with the microphone headset.

As used herein, the terms "data," "information," "input(s)," "signal(s)," and other similar terms may be used interchangeably to refer to information capable of being transmitted, received, and/or stored in accordance with embodiments of the present invention. Thus, use of any such terms should not be taken to limit the spirit and scope of embodiments of the present invention. By way of example, in some embodiments described herein, a speech signal (e.g., sound emission, noise, word command, utterance, and the like) may be received by a microphone and further interpreted by the microphone (e.g., via various applications, modules, or computing devices utilized therein) to correlate the speech signal with a task to be completed by one or more systems in communication with the microphone.

As used herein, the terms "application," "app," and "software application" may refer to computer-executable application software programmed to or capable of running on a processing unit of a server, computing device, mobile device, or the like. In some embodiments discussed herein, a software application may be used to determine a feedback parameter associated with a signal input (e.g., speech signal input) and further compare the feedback parameter with one or more feedback thresholds.

As used herein, the term "feedback parameter" may refer to a calculated value or other characterization of a speech signal (e.g., data, input, or the like) received by a microphone. By way of example, and discussed in detail hereinafter, a microphone may receive a speech signal input (e.g., a spoken user command, utterance, or the like) transmitted by a user associated with the microphone. The microphone (e.g., via one or more modules, applications, computing devices, etc.) may interpret this speech signal and determine various characteristics (e.g., properties, attributes, or the like) of the speech signal. By way of a more particular example in reference to an embodiment discussed herein, the microphone may interpret the speech signal and may determine the number of times a particular speech signal (e.g., spoken user command) has been received by the microphone (e.g., a repetition parameter).

As used herein, the term "feedback threshold" refers to a defined acceptable value to which a feedback parameter may be compared. By way of example, in an instance in which the feedback parameter refers to a repetition parameter as described above, a feedback threshold may refer to an acceptable value for the number of times a speech signal (e.g., a word command) may be received by the microphone before the signal is correctly interpreted and the correct associated task is instigated. Particularly, in instances in which the feedback parameter satisfies the feedback threshold, the microphone may be determined to be in either a pass state or a fail state (e.g., dependent upon the feedback parameter at issue). Further, a feedback threshold may be, in some embodiments, a user defined acceptable value, and, in other embodiments, may be set by a system administrator or programming specification. In some embodiments, the microphone may employ a trainable classifier or machine learning model to improve future determinations of a feedback threshold.

As used herein, the term "confidence parameter" may refer to an average score, measurement, or similar qualification of a microphone's recognition (e.g., via modules, applications, or the like) of a speech signal provided by a user. Similarly, the term "confidence threshold" may refer to an acceptable confidence score range for speech signals received and recognized by the microphone. By way of example, speech signals (e.g., word commands) may be received by the microphone corresponding to a particular task to be completed by a system in communication with the microphone. The microphone (e.g., via modules, applications, or the like) may correctly associate the speech signals with the appropriate task for some of the received speech signals. The microphone may then assign a confidence parameter to the particular speech signal indicative of the microphone's confidence that the speech signal is correctly interpreted (e.g., recognized by the microphone and associated with the correct command or task). This confidence parameter may then be compared with a confidence threshold to determine a pass state or fail state of the orientation of the microphone, dependent upon if the confidence parameter satisfies the confidence threshold.

As used herein, the term "vocabulary assistance parameter" may refer to an average score, measurement, or similar qualification of a microphone's use of matched similar vocabulary (e.g., hint, speech recognition assistance, word approximation, or the like) with a speech signal provided by a user. Similarly, the term "vocabulary assistance threshold," may refer to an acceptable vocabulary assistance score range for speech signals received and recognized by the microphone. By way of example, speech signals (e.g., word commands) may be received by the microphone corresponding to a particular task to be completed by a system in communication with the microphone. The microphone (e.g., via modules, applications, or the like) may not, in some embodiments, correctly recognize the speech signal. In such an embodiment, the microphone may utilize vocabulary assistance or any other approximation of the speech command in order to assign the speech command with what the system believes is the correct command or task. A vocabulary assistance parameter may be associated with the speech signal indicative of the number of times a speech signal is interpreted by the microphone due to the use of vocabulary assistance. This vocabulary assistance parameter may then be compared with a vocabulary assistance threshold to determine a pass state or fail state of the orientation of the microphone, dependent upon if the vocabulary assistance parameter satisfies the vocabulary assistance threshold.

As used herein, the term "repetition parameter" may refer to the amount of times a speech signal has been received by the microphone before the microphone (e.g., via modules, applications, or the like) correctly associates the speech signal with the correct task. Similarly, the term "repetition threshold," may refer to an acceptable value for the amount of times required before a speech signal is correctly interpreted by the microphone. By way of example, speech signals (e.g., word commands) may be received by the microphone corresponding to a particular task to be completed by a system in communication with the microphone. The microphone (e.g., via modules, applications, or the like) may not, in some embodiments, correctly recognize the speech signal until repeated speech signals from a user are received. In such an embodiment, the microphone may record or otherwise store, as a repetition parameter, the number of repetitions of a speech signal before the speech signal is correctly interpreted. This repetition parameter may then be compared with a repetition threshold to determine a pass state or fail state of the orientation of the microphone, dependent upon if the repetition parameter satisfies the repetition threshold.

As used herein, the term "node exit attempt parameter" may refer to the amount of times a speech signal has been received by the microphone before the microphone (e.g., via modules, applications, or the like) correctly associates the speech signal with the correct word necessary to move a from a current node to a subsequent node in a particular vocabulary task map. Similarly, the term "node exit attempt parameter threshold," may refer to an acceptable value for the amount of times required before a speech signal is correctly interpreted such that movement from a current node to a subsequent node in a particular vocabulary task map is allowed. As would be understood by one of ordinary skill in the art in light of the present disclosure, speech recognition applications, modules, software, programming, and the like may map vocabulary (e.g., via language trees, nodes, or the like) such that a word must be correctly identified by the software before progression to a subsequent word may occur. By way of example with reference to the present application, speech signals (e.g., word commands) may be received by the microphone corresponding to a particular task to be completed by a system in communication with the microphone. The microphone (e.g., via modules, applications, or the like) may not, in some embodiments, correctly recognize the speech signal until repeated attempts are made by a user. In such an embodiment, the microphone may record or otherwise store the number of attempts made by a user, as a node exit attempt parameter, before the speech signal is correctly interpreted by the microphone such that movement from a current node to a subsequent nodes is allowed. This node exit attempt parameter may then be compared with a node exit attempt threshold to determine a pass state or fail state of the orientation of the microphone, dependent upon if the node exit attempt parameter satisfies the node exit attempt threshold.

As used herein, the terms "input gain parameter" and "energy level parameter" may refer to a measurement or similar qualification of an energy level or value (e.g., decibel gain) associated with a speech signal input received by the microphone. Similarly, the term "input gain threshold," may refer to an acceptable energy level or input gain for speech signals received and recognized by the microphone. By way of example, speech signals (e.g., word commands) may be received by the microphone corresponding to a particular task to be completed by a system in communication with the microphone. The microphone (e.g., via modules, applications, or the like) may determine the energy level of the speech signal, and may, in some embodiments, record this energy level as an input gain parameter. This input gain parameter may then be compared with an input gain threshold to determine a pass state or fail state of the orientation of the microphone, dependent upon if the an input gain parameter satisfies the an input gain threshold. Although described herein as an input gain or energy level associated with a speech signal, the present disclosure contemplates that any physical parameter of the speech signal (e.g., decibel gain, wavelength, frequency, pitch, or the like) may be utilized as a feedback parameter.

As used herein, the terms "user profile," "user data," "user-specific feedback data," "microphone profile," and "profile" may refer to a collection of preferences, settings, configurations, mobile device identifiers, data, and information associated with a specific headset device, mobile device, or user. A user profile refers therefore to the explicit digital representation of a user's identity and other data or information associated with the user (e.g., physical characteristics of a user, user-specific feedback data, etc.). A user profile configured in accordance with the present disclosure may be accessible by one or more of the software applications and/or modules that are supported by the microphone headset (e.g., via a computing device) and, thus, may include application-specific preferences, settings, configurations, data, and information. In some embodiments, a user profile may be used to store a description or characteristics of the user and/or of the microphone. In some embodiments, the microphone headset may be calibrated (e.g., a training step or the like) prior to use in a working environment. In such an embodiment, user-specific feedback data may be collected and stored by the headset during the calibration procedure and further utilized by the microphone headset, in the methods described hereinafter, to more accurately evaluate a speech signal input from a user.

As used herein, the term "user status change," "user status change data," "status change," or the like may refer to a change in a status (e.g., on break, shift ending, etc.) for a user associated with a microphone headset. By way of example, in some embodiments, the microphone may receive a speech signal input indicating that the user is leaving the working environment (e.g., taking a break). In such an embodiment, the headset may be configured to, for example, automatically move the microphone in an upward direction to a position (e.g., a third position) where speech signal inputs are unlikely to be received by the microphone.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the term "user interface" or "output device" refers to a digitally rendered interface generated by the microphone headset (via a computing device, modules, or the like contained therein) in accordance with various embodiments discussed herein and configured for display on a separate display or a display housed by the microphone headset. For example, a user interface may be configured to display a current position of the microphone or a volume setting of the microphone.

As used herein, the term "module," encompasses hardware, software and/or firmware configured to perform one or more particular functions.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an device to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term "circuitry" also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Overview

The present disclosure relates to an adjustable microphone headset for receiving speech signal inputs from a user. The microphone attached to the headset may use a boom to provide adjustment of the microphone's location. The adjustable microphone headset, as described herein, may receive and/or monitor system level feedback to determine parameters used for adjusting the microphone. Specifically, the microphone may receive speech signal inputs from a user in the form of an utterance. In response to the speech signal input, a feedback parameter may be calculated by the adjustable microphone headset. In accordance with various example embodiments described herein, the feedback parameter may include a confidence parameter defining an average recognition score of the speech signal inputs that match a desired output, a vocabulary assistance parameter defining a number of times that the speech signal input is recognized due to vocabulary approximation, and a node exit attempt parameter defining a number of the speech signal inputs required for a user to exit a particular node in a vocabulary task map. In an operation of the adjustable headset, the adjustable microphone headset may compare the feedback parameter with a feedback threshold. By comparing the feedback parameter with the feedback threshold, the adjustable headset may determine a pass state or a fail state associated with the position of the microphone headset. In this regard, a pass state may be determined in an instance in which the feedback parameter satisfies a feedback threshold, and the microphone may be maintained at a first position. The headset may also determine a fail state in an instance in which the feedback parameter fails to satisfy a feedback threshold, and the microphone may be moved from the first position to a second position relative to the user. As described herein, the movement of the microphone from the first position to the second position may be performed by a stepper motor of the headset allowing movement in an upward and/or a downward direction to reach a determined second position for the microphone headset.

Thus, by considering various headset related parameters, such as a confidence parameter, a vocabulary assisting parameter, and a node exit attempt parameter, the microphone of the headset may be automatically positioned at a location relative to a user's mouth such that speech inputs provided by the user are clearly and accurately received at the microphone of the headset. In this regard, as the headset automatically adjusts the microphone's position, any incorrect positioning of the microphone may be avoided such that errors in speech recognition or interruptions in performing various speech assisted tasks within a workflow environment may be prevented.

Exemplary System Architecture

With reference to FIG. 1, an example adjustable microphone headset 100 is illustrated including a microphone 102, a microphone boom 104, a headband 106, and a housing 108. As described hereinafter, the housing 108 may contain a stepper motor, gyroscope, or other applicable adjustment or monitoring elements. The adjustable microphone headset 100 may further be operatively connected to a computing device 200, as shown in FIG. 1.

The adjustable microphone headset 100, as shown in FIG. 1, may provide voice communication assistance to a user wearing the adjustable microphone headset 100. For example, a user wearing the adjustable microphone headset 100 may receive one or more voice based tasks from a workflow management system (not shown), and may provide one or more speech inputs through the adjustable microphone headset 100.

Although FIG. 1 illustrates an adjustable microphone headset 100 with a single microphone 102 and headband 106, any style or design of headset may be used for implementing the various embodiments described herein. For example, the adjustable microphone headset 100 may include headbands, neckbands, ear hooks, straps, or any combination thereof. Further, the adjustable microphone headset 100 may include a single earphone at one ear or two earphones, one at each ear. Illustratively, in accordance with various example embodiments described herein, the earphones may be over-the-ear headphones, in-ear headphones, or any combination thereof. Further, although described in reference to a headset, the present disclosure contemplates that the embodiments described herein are not limited to a headset and may be used in any product with an adjustable microphone (e.g., a hard hat, mask, visor, helmet, or the like).

With continued reference to FIG. 1, the adjustable microphone headset 100 may include a microphone 102 for receiving speech signal inputs from a user. The speech signal inputs may be received in the form of an utterance by a user. For example, the user may provide various speech inputs to the microphone in response to voice assisted commands received over the headset. By way of example, in a workflow environment an operator wearing the headset 100 may move within a warehouse and perform various tasks based on voice commands received on the headset 100 from a control room. Accordingly, in response to the commands, the operator may provide speech inputs to the microphone 102.

The microphone 102 may be attached to the housing 108 through a microphone boom 104 extending from the housing 108. The microphone 102 may be formed as an integral part of the microphone boom 104, or, in some embodiments, may be removably attached at a free end of the microphone boom 104. An opposing end of the microphone boom 104 may be movably attached to the housing 108. For example, the microphone boom 104 may be attached with a swivel or a pivot joint such that the microphone boom 104 may be rotated upwards or downwards relative to the housing 108. Further, in some embodiments, the microphone boom 104 may have one or more slidable assemblies located throughout the boom (e.g., along the length of the boom 104) such that, upon sliding, the microphone boom 104 may have an adjustable length. Thus, according to various aspects described above, the orientation and/or length of the microphone boom 104 may be adjustable to position the microphone 102 at an ideal position near the mouth of the user. Additionally, the microphone boom 104 may, in some embodiments, be configured to position the microphone 102 in a resting position (e.g., positioned such that speech signals are not received by the microphone 102).

The adjustable microphone headset 100 may further include a headband 106 for securing the adjustable microphone headset 100 to the user. The headband 106 may include a curved portion worn over the head of a user, as shown in FIG. 1. The curved portion may connect to an earphone at one end, and/or connect to two earphones at both ends of the curved portion (not shown). The earphone may include components and/or circuitry for enabling a user to receive voice data, including but not limited to, one or more speakers, drivers, digital to analog converter (DAC), noise cancellation circuitry, and the like. According to various embodiments described herein, the headband 106 may be of any shape or design and may be adjustable such that different users may adjust the adjustable microphone headset as desired. Further, the headband 106 may be attached to the microphone boom 104 via the housing 108 such that adjusting the headband may result in adjustment of the microphone 102.

In some embodiments, the housing 108 may include a sensor (not shown) for determining a position of the microphone 102 relative to a user. The sensor may measure an angle and/or an arc of the microphone 102, the microphone boom 104, or any combination thereof. Further, the sensor may determine a position of the microphone 102 in any units of measurement such as degrees or radians. The sensor may be any positional sensor including but not limited to, a radial positional sensor, a gyroscope, an accelerometer, or the like.

Further, the housing 108 may, in some embodiments, include a rotary mechanism (not shown) for adjusting a position and/or orientation of the microphone 102. For example, the rotary mechanism may be a stepper motor. In such an embodiment, the stepper motor may be operatively connected to the microphone boom 104. For example, the stepper motor may be connected to the microphone boom 104 via one or more gears and may receive an electrical signal corresponding to a radial position of the microphone 102 and/or the microphone boom 104. The stepper motor may convert the radial position to rotary steps of the stepper motor, which may cause the microphone boom 104 to pivot upwards or downwards, as desired. Further, the stepper motor may be connected to a power source such as a battery. In some embodiments, the stepper motor may, in consideration of power optimization, remain in an OFF state (e.g., without actively receiving power from the power source) until an adjustment of the microphone 102 is necessary. When an adjustment is necessary, the stepper motor may transition from the OFF state to an ON state (e.g., receiving power from the power source).

As described above, the adjustable microphone headset 100 may be operatively connected to a computing device 200. The computing device 200 may be, as described hereinafter, configured to calculate a feedback parameter based on the speech signal input received by the microphone 102. The computing device 200 may further be configured to determine an adjustment of the microphone 102 from a first position to a second position relative to a user based upon the calculated feedback parameter. In some embodiments, the computing device 200 may be a portable computing device carried by a user wearing the adjustable microphone headset 100. For example, the computing device 200 may be a mobile device such as a personal digital assistant (PDA), smartphone, encoded information reading terminal, or the like. In some other embodiments, the computing device 200 may be a fixed computing device such as a host computer communicating with the adjustable microphone headset 100. In accordance with various embodiments described herein, the computing device 200 may be connected to the adjustable microphone headset 100 through a wired connection, near field communication interface, wireless interface, and/or the like. Further, the computing device 200 may be disposed, in some embodiments, within the housing 108, such that the computing device communicates with the other components of the adjustable microphone headset 100 through an internal data bus or control lines. Further description of the computing device and associated circuitry 200 are described below with reference to FIG. 2.

Figure 2:
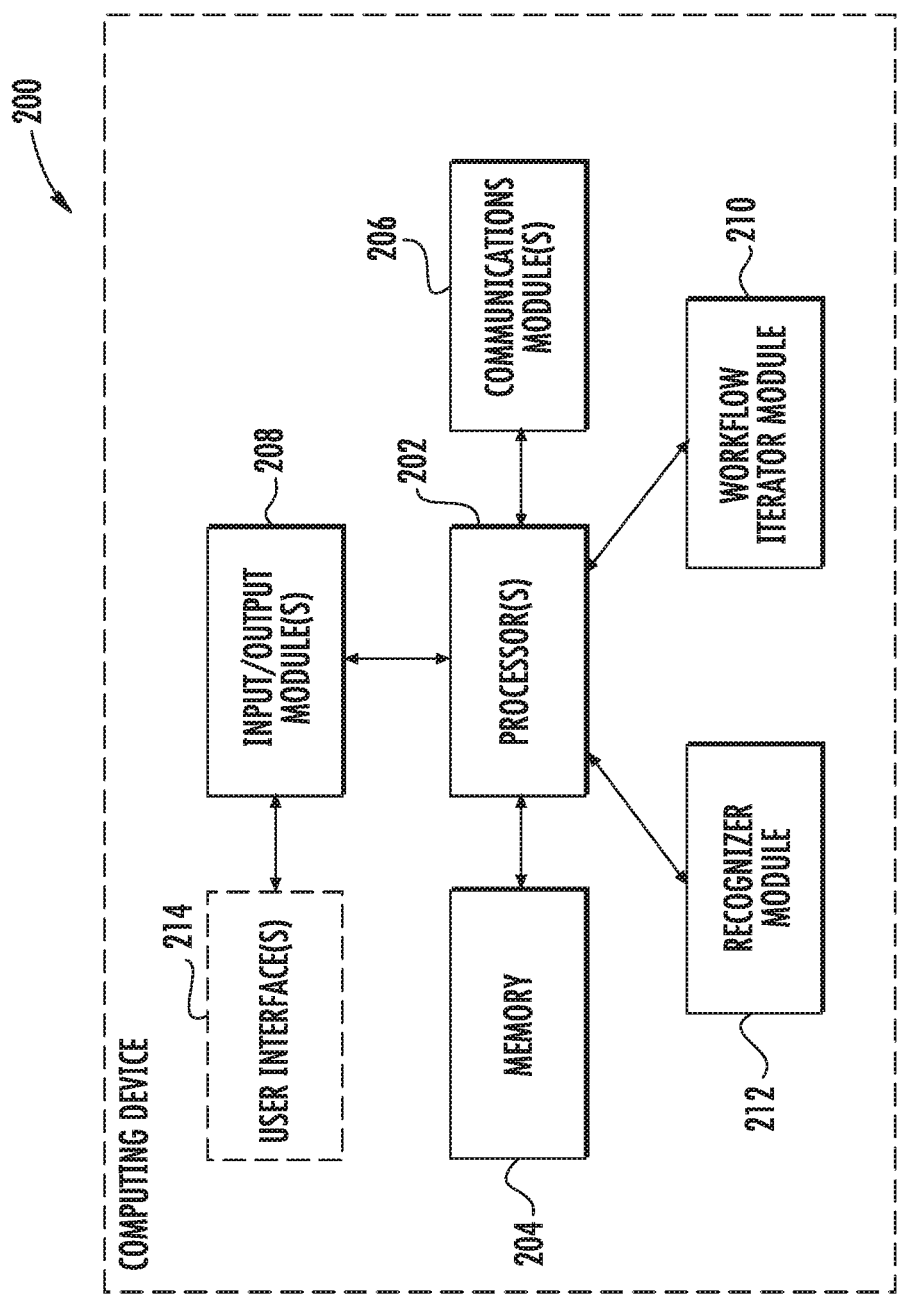
FIG. 2 shows a schematic block diagram of a computing device, according to an example embodiment of the present disclosure.

FIG. 2 shows a schematic block diagram of an example circuitry 200, some or all of which may be included in the adjustable microphone headset 100 and any associated computing device contained therein. In accordance with some example embodiments, circuitry 200 may include various elements, such as one or more processors 202, memory(s) 204, communications modules 206, input/output modules 208, a workflow iterator module 210, a recognizer module 212, and/or user interface(s) 214.

The elements of circuitry 200 as described herein may be embodied as, for example, circuitry, hardware elements (e.g., a suitably programmed processor, combinational logic circuit, integrated circuit, or the like), a computer program product comprising computer-readable program instructions stored on a non-transitory computer-readable medium (e.g., memory 204) that is executable by a suitably configured processing device (e.g., processor 202), or some combination thereof.

The processor 202 may, for example, be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 202 may comprise a plurality of processing means. The plurality of processing means may be embodied on a single computing device or may be distributed across a plurality of computing devices collectively configured to function as the circuitry 200. The plurality of processing means may be in operative communication with each other and may be collectively configured to perform one or more functionalities of the circuitry 200 as described herein. In an example embodiment, the processor 202 may be configured to execute instructions stored in the memory 204 or otherwise accessible to the processor 202. These instructions, when executed by the processor 202, may cause the circuitry 200 to perform one or more of the functionalities described herein. In some embodiments, the processor 202 may calculate or otherwise determine a feedback parameter based on a speech signal input received from a user by the input/output module 208 (e.g., the microphone 102 of FIG. 1). The processor 202 may then compare the feedback parameter with a feedback threshold and may be store one or both of the feedback parameter and feedback threshold in the memory 204. Further, the processor 202 may determine a pass state or a fail state of the position of the microphone 102 based on the comparison of the feedback parameter with the feedback threshold. If a pass state is determined (e.g., the feedback parameter satisfies the feedback threshold), the processor 202 may determine that the microphone 102 is correctly positioned with respect to the user's mouth (e.g., at the first position). However, the processor 202 may determine a fail state (e.g., the feedback parameter does not satisfy the feedback threshold) and may determine that the microphone 102 should be moved from the first position to a second position relative to a user, such that the speech inputs provided by the user may be accurately received by the microphone.

Whether configured by hardware, firmware/software methods, or by a combination thereof, the processor 202 may comprise an entity capable of performing operations according to embodiments discussed herein while configured accordingly. Thus, for example, when the processor 202 is embodied as an ASIC, FPGA or the like, the processor 202 may comprise specifically configured hardware for conducting one or more operations described herein. As another example, when the processor 202 may be embodied as an executor of instructions, such as may be stored in the memory 204, the instructions may specifically configure the processor 202 to perform one or more algorithms, methods, or operations described herein. For example, the processor 202 may be configured to execute operating system applications, firmware applications, among others.

The memory 204 may comprise, for example, volatile memory, non-volatile memory, or some combination thereof. Although illustrated in FIG. 2 as a single memory, the memory 204 may comprise a plurality of memory components. The plurality of memory components may be embodied on a single computing component or distributed across a plurality of computing components. In various embodiments, the memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. The memory 204 may be configured to store information, data, applications, instructions, or the like for enabling the circuitry 200 to carry out various functions in accordance with example embodiments discussed herein. For example, in at least some embodiments, the memory 204 may be configured to buffer input data for processing by the processor 202. Additionally or alternatively, in at least some embodiments, the memory 204 may be configured to store program instructions for execution by the processor 202 and/or data for processing by the processor 202. The memory 204 may store information in the form of static and/or dynamic information. This stored information may be stored and/or used by the circuitry 200 during the course of performing its functionalities.

The communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry, component, server, module, or the like. In some embodiments, the communications module 206 (like other components discussed herein) can be at least partially embodied as or otherwise controlled by the processor 202. In this regard, the communications module 206 may be in communication with the processor 202, such as via a bus. The communications module 206 may include, for example, an antenna, a transmitter, a receiver, a transceiver, network interface card and/or supporting hardware and/or firmware/software for enabling communications. The communications module 206 may be configured to receive and/or transmit any data that may be stored by memory 204 using any protocol that may be used for communications. The communications module 206 may additionally and/or alternatively be in communication with the memory 204, the input/output module 208, and/or any other component of the circuitry 200, such as via a bus. The communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, or 5.6 GHz communication systems), infrared, GSM, GSM plus EDGE, CDMA, quad band, and other cellular protocols, VOIP, or any other suitable protocol.

The input/output module 208 may be in communication with the processor 202 to receive an indication of an input and/or to provide an audible, visual, mechanical, or other output. In that sense, the input/output module 208 may include means for performing analog-to-digital and/or digital-to-analog data conversions. The input/output module 208 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. The input/output module 208 may be in communication with the memory 204, the communications module 206, or any other component(s), such as via a bus. Although more than one input/output module and/or other component can be included in the circuitry 200, only one is shown in FIG. 2 to avoid overcomplicating the disclosure (e.g., like the other components discussed herein).

The user interface(s) 214 may be in communication with input/output interface(s) 208. The user interface(s) may provide an indication of various microphone headset parameters. In some embodiments, the user interface(s) may be illustrated on a display (not shown), although in some embodiments, this user interface(s) may be indicated using alternative means (e.g., by microphone (which can provide a verbal indication), a braille pad (which can provide a tactile indication), or the like). The user interface(s) 214 may be implemented as part of the adjustable microphone headset 100 or may be provided by a separate device.

As illustrated in FIG. 2, the circuitry 200 may include a workflow iterator module 210. The workflow iterator module 210 may modify the feedback parameter calculated by the processor 202, as described above. In this regard, the workflow iterator module 210 may include a node exit parameter (e.g., ParamDE) defining a number of attempts required for a user to exit a particular node in a vocabulary task map. Specifically with reference to a workflow solution, a logical vocabulary task map having one or more nodes and/or branches may be created where each node of the vocabulary task map may be associated with a task in a workflow. On completion of the task specific to a node, a user may be required to provide a task completion notification to a workflow management system to exit the node and move to a subsequent node. For example, an operator performing various tasks in a workflow using the headset 100 may provide audio or voice commands notifying a workflow management server connected to the headset about the completion of a task or a step within the workflow.

In some cases (e.g., when the microphone 102 is incorrectly positioned), a speech signal input received from a user for exiting a node in the vocabulary task map may not be recognizable. In such an example, the user may be required to repeat the speech signal input multiple times until the microphone recognizes the speech input. In this regard, the workflow iterator module 210 may calculate a number of attempts made by the user to exit a particular node in the vocabulary task map. The workflow iterator module 210 and/or the processor 202 may then compare the node exit parameter (e.g., ParamDE) with a node exit attempt threshold. According to various example embodiments, the node exit attempt threshold may be specific to a particular node or may be defined for all nodes of the vocabulary task map. Further, the node exit attempt threshold may be predefined by a manufacturer, defined individually for each user, and/or determined during a calibration or training phase. The workflow iterator module 210 and/or the processor 202, based on the comparison as described herein, may determine if a position of the microphone 102 is to be maintained or modified.

As illustrated in FIG. 2, the circuitry 200 may further include a recognizer module 212. In some embodiments, the recognizer module 212 may comprise a decoder for decoding speech signal inputs received by the microphone inputted by a user. The recognizer module 212 may also modify the feedback parameter calculated by the processor 202, as described above. In this regard, the recognizer module 212 may determine the feedback parameter including a confidence parameter (e.g., ParamSCORE) and a vocabulary assistance parameter (e.g., ParamHINT). The confidence parameter (e.g., ParamSCORE) may define an average recognition score of the speech signal inputs received from a user that match a desired output. As would be understood by one of ordinary skill in the art in light of the present disclosure, the recognizer module 212 may include speech processing circuitry for recognizing, parsing, and/or synthesizing speech signal inputs. The processed speech signal inputs may be compared to a stored vocabulary and/or dictionary to decode and match the speech signal input to the desired output. Therefore, the confidence parameter (e.g., ParamSCORE) may indicate a level of confidence of the recognizer module 212 in predicting speech signal input recognition. Further, the vocabulary assistance parameter (e.g., ParamHINT) may define a number of times the speech signal input is recognized due to vocabulary approximation. In some embodiments, the recognizer module 212 may include speech repair circuitry configured to modify unclear speech signal inputs based on contextual hints. For example, if a workflow solution prompts a user to provide a Yes/No confirmation for a work related task and the speech signal input received from the user is identified as "Yet," the recognizer module 212 may overwrite the speech signal input as "Yes" based upon the context. Therefore, the recognizer module 212 may monitor and calculate a number of times modifications are made as the vocabulary assistance parameter (e.g., ParamHINT).

Further, in some embodiments, the recognizer module 212 may not be able to readily match the speech signal input to a desired output which may result in a reduction in the confidence parameter (e.g., ParamSCORE). The recognizer module 212 may further rely on vocabulary approximation to recognize the speech signal input and may increase the vocabulary assistance parameter (e.g., ParamHINT). The recognizer module 212 and/or the processor 202 may then compare the confidence parameter (e.g., ParamSCORE) and/or the vocabulary assistance parameter (e.g., ParamHINT) with a confidence threshold and a vocabulary assistance threshold, respectively. Based upon the comparison, the recognizer module 212 and/or the processor 202 may determine if a position of the microphone 102 is to be maintained at a first position or has to be changed from a first position to a second position relative to a user.

In some embodiments, a speech signal input may include user status change data, as described above. The user status change data may refer to a change in status of a user associated with the adjustable microphone headset 100. For example, a user may be executing an order picking workflow in a warehouse and/or a retail store using the adjustable microphone headset 100. In an instance when the user is on his or her shift, the user may provide one or more speech signal inputs required for executing individual tasks in the order picking workflow. Thus, it may be desirable to position the microphone 102 relatively close to a mouth of the user to ensure the speech signal input is properly received by the microphone 102. Further, if the user desires to go on a break or when the user's shift ends, the microphone 102 may receive a speech signal input indicating that the user is leaving the working environment (e.g., taking a break). In such an embodiment, the processor 202 and/or the recognizer module 212 may be configured to, for example, automatically move the microphone 102 and/or the microphone boom 104 in an upward direction to a position the microphone at a third position such that speech signal inputs are unlikely to be received by the microphone 102.

In some embodiments, the workflow iterator module 210 and/or the recognizer module 212 may also or instead be included and configured to perform the functionality discussed herein related to adjusting the adjustable microphone headset 100. In some embodiments, some or all of the functionality of the adjustable microphone headset 100 may be performed by the processor 202. In this regard, some or all of the example processes and algorithms discussed herein can be performed by at least one processor 202, workflow iterator module 210, and/or the recognizer module 212. For example, non-transitory computer readable storage media can be configured to store firmware, one or more application programs, and/or other software, which include instructions and other computer-readable program code portions that can be executed to control processors of the components of the microphone headset or computing device contained therein by the circuitry 200 to implement various operations, including the examples shown herein. As such, a series of computer-readable program code portions may be embodied in one or more computer program products and can be used, with a device, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, databases, systems, and the like. Accordingly, embodiments may include various means comprised entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Adjustable Headset and Microphone

Embodiments have been described above with reference to block diagrams of components, such as functional modules, system components and circuitry. Below is a discussion of example process flowcharts describing functionality that may be implemented by one or more components discussed above. Each block of the block diagrams and process flowcharts, and combinations of block diagrams and process flowcharts, respectively, can be implemented by various means including computer program instructions. These computer program instructions may be loaded onto a general purpose computer, special purpose computer, or other programmable data processing apparatus, such as the processor 202, to produce a machine, such that the computer program product includes the instructions which execute on the computer or other programmable data processing apparatus to create a means for implementing the functions specified in the flowchart block or block diagrams.

Figure 3:
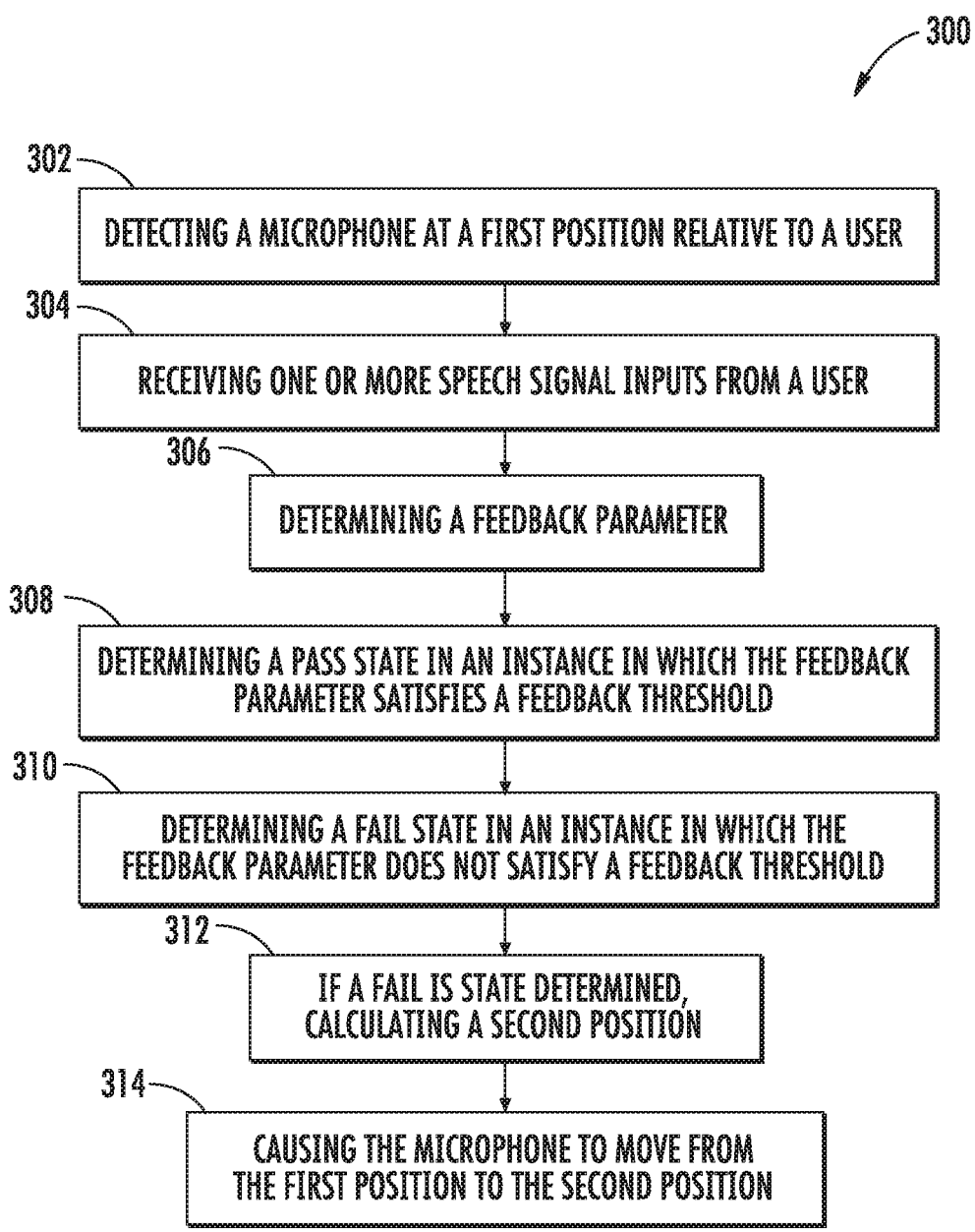
FIG. 3 shows a flowchart illustrating operations performed, such as by the computing device of FIG. 2, in accordance with an example embodiment of the present disclosure.

With reference to FIG. 3, a method 300 for adjusting an orientation of a headset is shown. The adjustable microphone headset 100 may include means, such as the processor 202 or the like, for detecting a microphone 102 at a first position relative to a user at Block 302. As described above, the adjustable microphone headset 100 may include a sensor, such as a radial positional sensor, gyroscope, accelerometer, and/or the like, for measuring an angle and/or an arc of the microphone 102 and/or the microphone boom 104 relative to the user. Thus, the sensor and/or the processor 202, in communication with the sensor, may determine a first position of the microphone 102 relative to the user. Further, the adjustable microphone headset 100 may include means, such as the processor 202, the microphone 102, or the like, for receiving one or more speech signal inputs from a user at Block 304. The speech signal inputs may include any sound emission, word command, utterance, or the like, received from the user. In some embodiments, the speech signal input received from a user may relate to a command and/or query related to a task in a workflow solution. For example, a user may provide a speech signal input indicating an aisle and/or shelf location corresponding to a pick-up or a storage location within a warehouse, or may provide a speech signal input indicating an address and/or location for routing a shipment. In some embodiments, a user may be executing a workflow solution including receiving and providing speech signal inputs to the adjustable microphone headset 100. For example, the adjustable microphone headset 100 may provide (e.g., output) a pick-up location corresponding to an item to be picked up in a warehouse and/or a distribution facility to a user. Once the user arrives at the pick-up location and picks up the article, the user may be required to provide a speech signal input indicating a pick-up confirmation to the adjustable microphone headset 100 in order to move further in the workflow. In some embodiments, a user may provide a speech signal input indicating an identification number, serial number, or the like identifying a corresponding item picked-up by the user, as well as an aisle and/or shelf number confirming a pick-up location or other physical location identifier. In some embodiments, a speech signal input may be received from a speaker of another device (e.g., a mobile device carried by a user).

The adjustable microphone headset 100 may include means, such as the processor 202, recognizer module 212, and/or workflow iterator module 210, for determining a feedback parameter at Block 306. The feedback parameter may refer to a characterization and/or a calculated value of a speech signal input received by the adjustable microphone headset 100. In some embodiments, the processor 202 may calculate a feedback parameter based on a speech signal input received from a user by the microphone 102, as shown in FIG. 1. The microphone 102 may receive a speech signal input (e.g., spoken user command, utterance, or the like) transmitted by a user associated with the microphone 102. The microphone 102 and/or the processor 202 may analyze and interpret the speech signal input via one or more modules, applications, or computing devices, such as, but not limited to, speech synthesizer, analog-to-digital convertor, speech parser and/or decoder, etc. For example, the microphone 102 and/or the processor 202 may include a speech synthesizer module for parsing the speech signal input and determining various characteristics (e.g., properties, attributes, or the like) associated with the parsed speech signal input.

Specifically, the microphone 102 and/or the processor 202 may determine a confidence parameter (e.g., ParamSCORE), described below with reference to FIG. 4, indicative of an average recognition score of the speech signal inputs that match a desired output. In some embodiments, a recognizer module 212 may comprise a decoder for decoding speech signal inputs received by the microphone 102. The processed speech signal inputs may be compared to a stored vocabulary and/or dictionary to decode and match the speech signal input to the desired output. Therefore, the confidence parameter (e.g., ParamSCORE) may indicate a level of confidence of the recognizer module 212 in recognizing speech signal inputs.

Further, the microphone 102 and/or the processor 202 may determine a vocabulary assistance parameter (e.g., ParamHINT), described below with reference to FIG. 5, indicative of a number of times that the speech signal input is recognized due to vocabulary approximation. In some embodiments, the recognizer module 212 may include speech repair circuitry configured to modify unclear speech signal inputs based on contextual hints. For example, as described above, if a workflow solution prompts a user to provide a Yes/No confirmation for a work related task and the speech signal input received from the user is identified as "Yet," the recognizer module 212 may overwrite the speech signal input as "Yes" based upon the context. Accordingly, the recognizer module 212 may monitor and calculate a number of times such modifications are made due to vocabulary approximation and/or contextual hints to determine the vocabulary assistance parameter (e.g., ParamHINT).

The microphone 102 and/or the processor 202 may further determine a node exit attempt parameter (e.g., ParamDE), described below with reference to FIG. 6, indicative of a number of speech signal inputs required for a user to exit a particular node in a vocabulary task map. In this regard, the workflow iterator module 210 may include a node exit parameter defining a number of attempts required for a user to exit a particular node in a vocabulary task map. Specifically, with reference to a workflow solution, a logical vocabulary task map having one or more nodes and/or branches may be created where each node of the vocabulary task map may be associated with a task in a workflow. Upon completion of the task specific to a node, a user may be required to provide a task completion notification to a workflow management system to exit the node and move to a subsequent node. The processor 202 may count a number of attempts made to exit a particular node and may determine a corresponding node exit parameter (e.g., ParamDE).

Thus, as described above, the processor 202 may determine a feedback parameter that includes a confidence parameter (e.g., ParamSCORE) indicative of an average recognition score of the speech signal inputs that match a desired output, a vocabulary assistance parameter (e.g., ParamHINT) indicative of a number of times that the speech signal input is recognized due to vocabulary approximation, and a node exit attempt parameter (e.g., ParamDE) indicative of a number of the speech signal inputs required for a user to exit a particular node in a vocabulary task map.

In some other embodiments, the feedback parameter may include user-specific feedback data. By way of example, the user-specific feedback data may include a user profile and/or a microphone profile including a collection of preferences, settings, configurations, mobile device identifiers, data, and/or information associated with a specific headset, mobile device, microphone, and/or user. Specifically, the user-specific feedback data may refer to a digital representation of a user's identity and other data or information associated with the user (e.g., physical characteristics of a user, user-specific feedback data, etc.). In some embodiments, a user profile may be used to store a description or characteristic of the user and/or of the microphone. In some embodiments, the adjustable microphone headset 100 may be calibrated (e.g., via a training step or the like) prior to use in a working environment. In such an embodiment, the user-specific feedback data may be collected and stored by the adjustable microphone headset 100 during the calibration procedure and further utilized by the adjustable microphone headset 100 to more accurately evaluate a speech signal input from a particular user. For example, the user-specific feedback data collected during calibration may include a head size of the user, mouth position, audio pitch, preferred microphone boom position, and the like. In some embodiments, the user-specific feedback data may be collected for each user individually and stored as a user profile associated with each user. In some other embodiments, the user-specific feedback data may also be collected for a group of users, and a standard user and/or microphone profile may be calculated based on an average of collected values representative of the group of users. Further, the processor 202 or the like may recognize user-specific feedback data in a speech signal input received by the microphone 102 and may calculate a feedback parameter based on the user-specific feedback data. For example, a user may provide a speech signal input including his name and/or employee ID (e.g. identification number or the like), and the processor 202 may retrieve a user profile associated with the inputted name and/or the employee ID. Further, the processor 202 may determine a feedback parameter based on the one or more parameters provided in the user profile (e.g., one or more parameters stored from a calibration step or the like). The feedback parameter may then be used to adjust a position of the microphone 102 and/or the microphone boom 104.

The adjustable microphone headset 100 may include means, such as the processor 202 or the like, for determining a pass state in an instance in which the feedback parameter satisfies a feedback threshold at Block 308. As described above, a feedback threshold may define an acceptable value to which a feedback parameter may be compared. For example, in an instance in which the feedback parameter refers to a node exit attempt parameter as described below, a feedback threshold may refer to an acceptable value for a number of times a speech signal input (e.g., a word command) required for a user to exit a particular node in a vocabulary task map may be received by the microphone 102 before the speech signal input is correctly interpreted and the particular node in the vocabulary task map is exited. Further, a feedback threshold may be, in some embodiments, a user defined acceptable value, and, in other embodiments, may be set by a system administrator or programming specification. In some embodiments, the microphone may employ a trainable classifier or machine learning model to improve future determinations of a feedback threshold.

As described above, the processor 202 may compare the feedback parameter with a feedback threshold, and, if the feedback parameter satisfies the feedback threshold, a pass state may be determined. For example, in an instance in which the feedback parameter refers to a node exit attempt parameter, as described above, a feedback threshold may be set to a specific value (e.g., three (3) attempts) by a user, a system administrator, or programming specification. In this instance, the acceptable value for a number of times a speech signal input (e.g., word command) may be received by the microphone 102 before the speech signal input is correctly interpreted and the particular node in the vocabulary task map is exited (e.g., feedback threshold) is less than three (3) attempts. Thus, if a user repeats a node exit command, such as a pick-up confirmation command, twice (e.g., two (2) speech signal inputs) before the node exit command is recognized by the microphone 102 and/or processor 202, and the particular node in the vocabulary task map is exited, and a pass state may be determined by the processor 202. Further, if the pass state is determined at Block 308, the processor 202 may determine that the microphone 102 is correctly positioned and may maintain the position of the microphone 102. Alternatively, the processor 202 may determine a fail state in an instance in which the feedback parameter does not satisfy a feedback threshold at Block 310. The fail state may indicate that the speech signal input received from a user may not be recognizable or may be of a poor quality. In some embodiments, the fail state may indicate that the microphone 102 is incorrectly positioned relative to the user which may result in a poor quality speech signal input. For example, in an instance in which the feedback parameter refers to a node exit attempt parameter, as described above, a feedback threshold may be set to a specific value (e.g., three (3) attempts) as described above, and a user may repeat a node exit command five (5) times before the node exit command is recognized by the microphone 102 and/or processor 202 and the particular node in the vocabulary task map is exited. In such an example, a fail state may be determined by the processor 202.

In some embodiments, the processor 202 may determine a fail state by testing of a confidence parameter, a vocabulary assistance parameter, and/or a node exit attempt parameter with respective thresholds. Specifically, a fail state may be determined by the processor 202 when the confidence parameter is less than a confidence threshold, the vocabulary assistance parameter is greater than a vocabulary assistance threshold, or the node exit attempt parameter is greater than a node exit attempt threshold. The processor 202 may determine a confidence parameter, a vocabulary assistance parameter, and/or a node exit parameter, as described hereinafter, and compare the determined values to a corresponding predetermined threshold, stored in a memory, or otherwise accessible to the processor 202. The confidence parameter threshold, the vocabulary assistance parameter threshold, and/or the node exit parameter threshold may be, in some embodiments, a user defined acceptable value, and in other embodiments may be set by a system administrator or programming specification. In some embodiments, the microphone 102 may employ a trainable classifier or machine learning model to improve future determinations of a threshold.

Further, if a fail state is determined at Block 310, the adjustable microphone headset 100 may include means, such as the processor 202 or the like, for calculating a second position of the microphone 102 at Block 312. In some embodiments, a sensor, as described above with reference to FIG. 1, may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position, defined by parameters such as height, angular rotation, tilt, yaw, and the like of the microphone boom 104, and may compare it to a current position of the microphone boom 104 as identified by a radial position sensor, a gyroscope, or the like. Further, the processor 202 may calculate a second position based on a difference between the ideal second position and the current position (e.g., a first position). In some embodiments, the second position may be defined in terms of three-dimensional coordinates corresponding to a desired position of the microphone boom 104.

In some embodiments, the processor 202 and/or a sensor, such as a gyroscope, may determine a first angular position of the microphone 102 and/or the microphone boom 104. The first angular position of the microphone 102 and/or the microphone boom 104 may be defined relative to a user in degrees, radians, unit vector, and the like. As described above, the processor 202 may determine a pass state in an instance in which the feedback parameter satisfies the feedback threshold. In this instance, the processor 202 may maintain the microphone 102 and/or the microphone boom 104 at the first angular position. Alternatively, the processor 202 may determine a fail state in an instance in which the feedback parameter fails to satisfy a feedback threshold, and determine a second angular position of the microphone 102 and/or the microphone boom 104 relative to the user. The processor 202 and/or a stepper motor may move the microphone 102 and/or the microphone boom 104 from the first angular position to the second angular position.

In some other embodiments, the processor 202 may access a stored predetermined value for a second position of the microphone 102 based on a prior training and/or calibration. As describe above, the adjustable microphone headset 100 may include means, such as the processor 202 and/or stepper motor, for causing the microphone to move from the first position to the second position at Block 314. As described above, the stepper motor may be operatively connected to the microphone boom 104 shown in FIG. 1. The stepper motor may receive an electrical signal corresponding to the second position of the microphone 102. The stepper motor may convert the second position to rotary steps of the stepper motor which may cause the microphone boom 104 to pivot upwards or downwards from the first position to the second position relative to a user.

Figure 4:
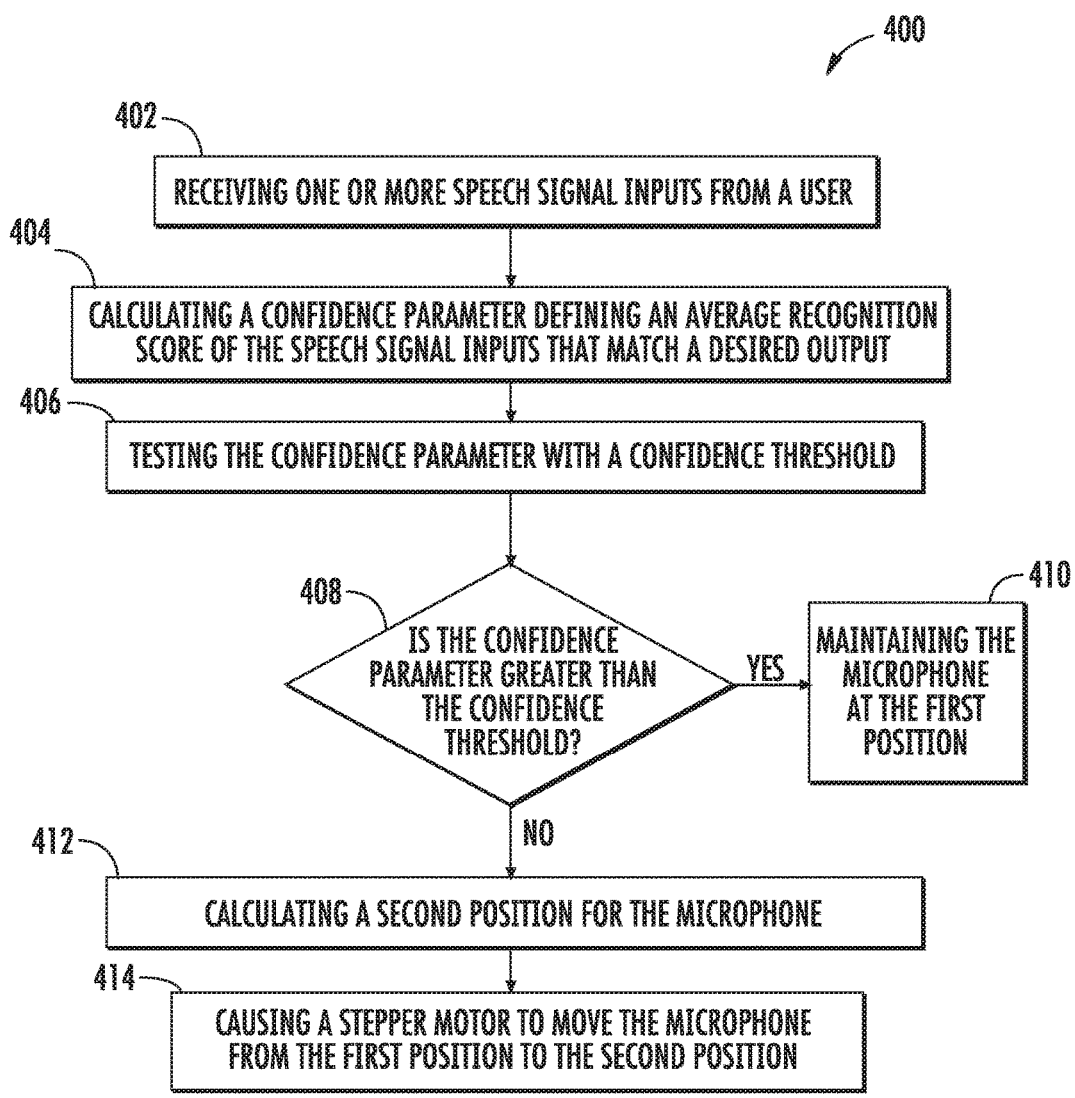
FIG. 4 shows a flowchart illustrating operations determining a confidence parameter, such as by the computing device of FIG. 2, in accordance with an example embodiment of the present disclosure.

With reference to FIG. 4, a method 400 for determining a confidence parameter (e.g., ParamSCORE) is shown. The adjustable microphone headset 100 may include means, such as the processor 202 or microphone 102, for receiving one or more speech signal inputs from a user at Block 402. As described above, the speech signal inputs received by the microphone 102 from the user may relate to a command and/or query related to a task in a workflow solution. The adjustable microphone headset 100 may further include means, such as the processor 202 and/or recognizer module 212, for calculating a confidence parameter defining an average recognition score of the speech signal inputs that match a desired output at Block 404. The confidence parameter may refer to an average score, measurement, or similar qualification of a microphone's recognition (e.g., via modules, applications, or the like) of a speech signal input provided by a user. As described above, with reference to FIG. 2, the recognizer module 212 and/or the processor 202 may include speech processing circuitry for recognizing, parsing, and/or synthesizing speech signal inputs. The processed speech signal inputs may be compared to a stored vocabulary and/or dictionary to decode and/or match the speech signal input to a desired output. In some instances, a speech signal input may be readily decoded and matched to a stored vocabulary and/or dictionary. For example, when the microphone 102 is correctly positioned, a speech signal input received from a user by the microphone 102 may be clear and distinct, and the recognizer module 212 and/or the processor 202 may parse, decode, and match the speech signal input to a stored desired output in less time and with fewer attempts than if the microphone 102 was incorrectly positioned. Thus, a confidence parameter associated with the speech signal input by the recognizer module 212 and/or the processor 202, in this instance, would be higher than when multiple attempts are required to recognize and/or match a speech signal input to a desired output.

In some embodiments, the recognizer module 212 and/or the processor 202 may count a number of times a particular speech signal input is provided, determine a number of times the speech signal input matches to a desired output, and divide these values to determine a confidence parameter associated with the speech signal input (e.g., an average confidence score). By way of a more particular example, when the confidence parameter is indicative of an average confidence score, the recognizer module 212 and/or the processor 202 may divide a number of times the speech signal input matches to a desired output by the number of speech signal inputs provided (e.g., such that the confidence values range between 0 and 1). In such a particular example, a confidence score of one (1) would be indicative of a system which correctly matches the speech signal input to a desired output for each speech signal input. Similarly, a confidence score closer to zero (0) (e.g., 0.25) would be indicative of a system which correctly matches the speech signal input to a desired output incorrectly more often than not (e.g., 25% of the time).

In some other embodiments, the recognizer module 212 and/or the processor 202 may track a time require to recognize a speech signal input and/or match the speech signal input to a desired output and may determine a confidence parameter based on the time taken to match the speech signal input to a desired output. For example, the recognizer module 212 and/or the processor 202, may refer to a predetermined look-up table to determine a confidence parameter associated with a time taken to correctly match a speech signal input to a desired output by the recognizer module 212 and/or the processor 202. Thus, the recognizer module 212 and/or the processor 202 may calculate the confidence parameter (e.g., ParamSCORE), indicative of a level of confidence the recognizer module 212 and/or the processor 202 in predicting recognition of a speech signal input.

As described above, in some cases, a speech signal input received from a user may not be clear. In such a case, the processor 202 and/or the recognizer module 212 may not be able to readily match the speech signal input to a desired output which may reduce the confidence parameter (e.g., ParamSCORE). The adjustable microphone headset 100 may further include means, such as the processor 202 and/or the recognizer module 212, for testing the confidence parameter with a confidence threshold at Block 406. The confidence threshold may be predetermined and accessible to the processor 202 and/or the recognizer module 212. Further, the adjustable microphone headset 100 may determine if the confidence parameter is greater than the confidence threshold at Block 408. As described above, the confidence threshold may refer to an acceptable confidence score value for speech signal inputs received and recognized by the microphone 102, the recognizer module 212, and/or the processor 202. Further, the confidence threshold may be, in some embodiments, a user defined acceptable value, and in other embodiments may be set by a system administrator or programming specification. In some embodiments, the microphone 102 may employ a trainable classifier or machine learning model to improve future determinations of a confidence threshold.

As an example, a confidence threshold may be set to a specific value (e.g., a confidence threshold of 0.7), by a user, a system administrator, or programming specification. In such an example, an acceptable confidence score (e.g., a confidence parameter) for speech signal inputs received and interpreted by the microphone 102 and/or the processor 202 may be, by the process above, determined to be greater than the confidence threshold (e.g., more likely than 70% of the time). In some embodiments, the processor 202 and/or the recognizer module 212 may track a change in confidence score and may define a confidence threshold as an acceptable range of change in confidence score. For example, based on a current position (e.g., a first position) of the microphone 102, the processor 202 and/or the recognizer module 212 may have a confidence score of 0.5 (e.g., 50% of speech signal inputs correctly matched to a desired output). However, upon a change in the position of the microphone 102, the confidence score may reduce to 0.3 (e.g., 30% of speech signal inputs correctly matched to a desired output). The processor 202 and/or the recognizer module 212 may track this change in confidence value (e.g., confidence parameter) and may compare it to a confidence threshold which may indicate an acceptable range of change in confidence parameter. For example, a confidence threshold may be set to a 20% range of change, such that when a change in the confidence parameter decreases by 20% or more, a fail state may be determined by the processor 202 and/or the recognizer module 212.

Said another way, the confidence parameter threshold may define a word rejection threshold such that words (e.g., speech signal inputs) with a confidence score (e.g., confidence parameter or ParamSCORE) below this confidence parameter threshold are rejected and/or ignored by the adjustable microphone headset 100. Similarly, words (e.g., speech signal inputs) with a confidence score (e.g., confidence parameter or ParamSCORE) above this confidence parameter threshold may be accepted and/or recognized by the adjustable microphone headset 100. As would be understood by one of ordinary skill in the art in light of the present disclosure, increasing the value of this threshold results in an increased difficulty for speech signal inputs to be accepted and/or recognized, while decreasing this threshold allows for more words to be accepted and/or recognized. By way of example, for applications in which an operator is speaking frequently (e.g., piece picking), a lower confidence parameter threshold may be used. For applications in which there is relatively little voice entry and background noises are present, a higher confidence parameter threshold may be used. As described herein, the confidence parameter threshold may, in some embodiments, be set by an operator based upon a particular task or may be set by a programming specification (e.g., a configuration file).

As described above, if the confidence parameter is greater than the confidence threshold at Block 408, the adjustable microphone headset 100 may include means, such as the processor 202 and/or stepper motor, for maintaining the microphone 102 at the first position at Block 410. In some embodiments, the microphone 102 may be maintained at the first position by maintaining an angular position of the microphone 102. In some cases, the confidence parameter may be less than a confidence threshold. For example, due to the current position of the microphone 102 (e.g., at a first position), the processor 202 and/or the recognizer module 212, may not be able to match a speech signal input to a desired output correctly and/or efficiently. For example, if the microphone 102 is positioned upwards or away from a mouth of a user, a speech signal input received at the microphone 102 may not be clear and/or distinct. In such an example, a confidence parameter associated with the speech signal input may be low. The confidence parameter when compared to a confidence threshold may be less than the confidence threshold defining the acceptable confidence score and/or range. In such an instance, a fail state may be determined by the processor 202 and/or the recognizer module 212.

As described above, if the confidence parameter is less than the confidence threshold at Block 408, the adjustable microphone headset 100 may include means, such as the processor 202 or the like, for calculating a second position for the microphone 102 at Block 412. As described above, in some embodiments, a sensor, such as a radial position sensor, a gyroscope, an accelerometer, or the like, may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position, defined by parameters such as height, angular rotation, tilt, yaw, and the like, of the microphone boom 104 and may compare it to a current position of the microphone boom 104, as identified by a radial position sensor, a gyroscope, or the like. Further, the processor 202 or the like, may calculate a second position based on a difference between the ideal second position and the current position (e.g., a first position). In some embodiments, the second position may be defined in terms of three-dimensional coordinates corresponding to a desired position of the microphone boom 104. In some embodiments, the processor 202 may determine a stored predetermined value of a second position of the microphone 102 based on prior training and/or calibration.

The adjustable microphone headset 100 may include means, such as the processor 202 and/or stepper motor, for causing the microphone to move from the first position to the second position at Block 414. As described above, the stepper motor may be operatively connected to the microphone boom 104 and may receive an electrical signal corresponding to the second position of the microphone 102. The stepper motor may convert the second position to rotary steps of the stepper motor, which may cause the microphone boom 104 to pivot upwards or downwards to move the microphone 102 from the first position to the second position.

The following pseudo-code illustrates an example of the method 400 as shown in FIG. 4.

```
REFERENCE_HASHMAP{Key : Value} = { ParamSCORE : refTHRESHOLD,... }
BEGIN:
    CURRENT_ParamSCORE =
GET_CURENT_ParamSCORE_FROM_RECOGNITION_DECODER_MODULE( )
    IF: CURRENT_ParamSCORE > REFERENCE_HASHMAP(value(ParamSCORE))
        NO_CHANGE_IN_MICROPHONE_POSITION
    ELSE:
        IF: CURRENT_MICROPHONE_POSITION ==
GET_STORED_MICROPHONE_POSITION_ORIENTATION( )
            NO_CHANGE_IN_MICROPHONE_POSITION
        ELSE:
            NEW_POSITION =
CALCULATE_NEW_POSITION_FOR_MICROPHONE(CURRENT_MICROPHONE_POSITION)
            SEND_INSTRUCTION_TO_CHANGE_POSITION_IN_HEADSET_MODULE(NEW_POSITION)
END:
```

Figure 5:
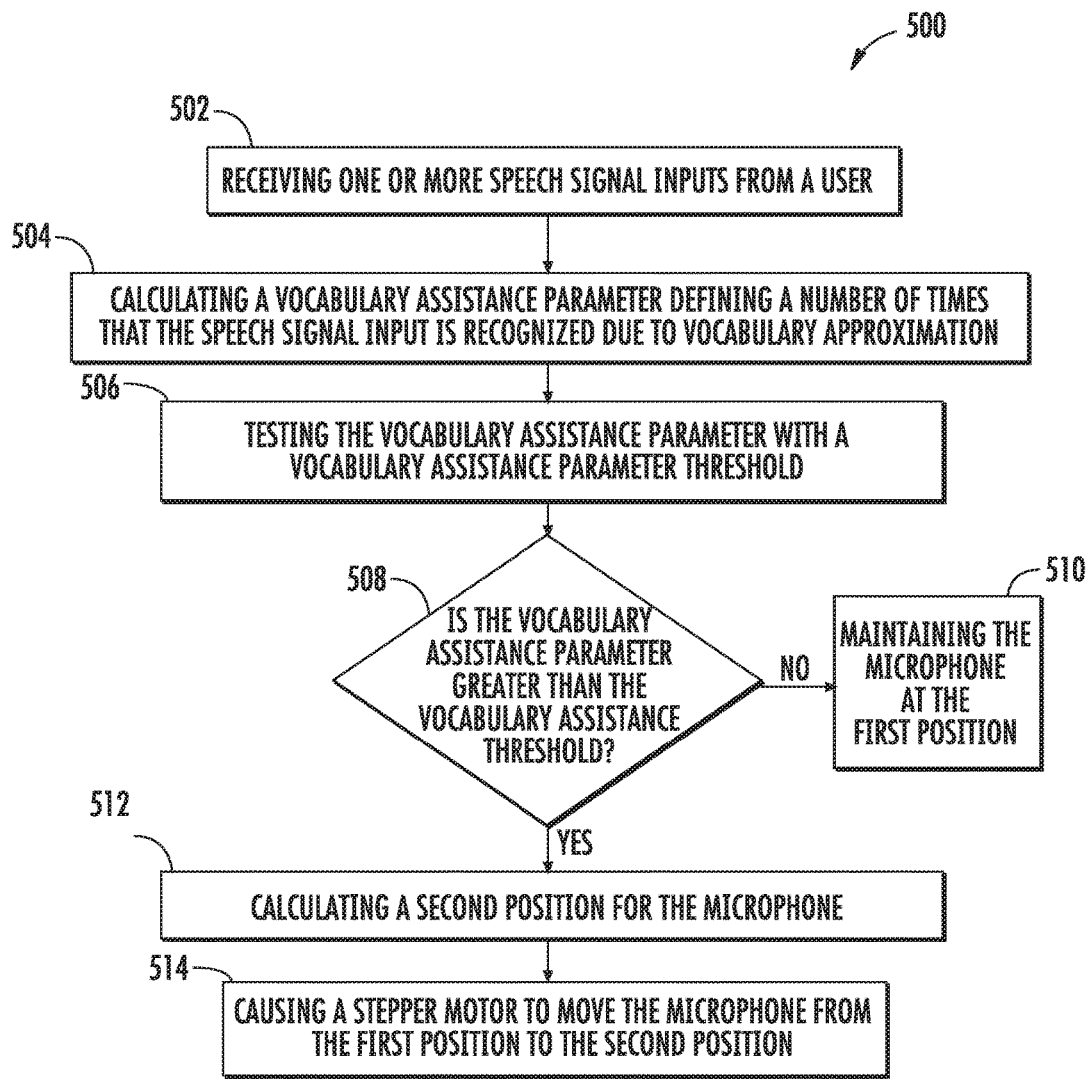
FIG. 5 shows a flowchart illustrating operations for determining a vocabulary assistance parameter, such as by the computing device of FIG. 2, in accordance with an example embodiment of the present disclosure.

With reference to FIG. 5, a method 500 for determining a vocabulary assistance parameter is shown. The adjustable microphone headset 100 may include means, such as the processor 202 or microphone 102, for receiving one or more speech signal inputs from a user at Block 502. As described above, the speech signal inputs received from the user may relate to a command and/or query related to a task in a workflow solution. The adjustable microphone headset 100 may include means, such as the processor 202 and/or recognizer module 212, for calculating a vocabulary assistance parameter defining a number of times that the speech signal input is recognized due to vocabulary approximation at Block 504. As described above with reference to FIG. 2, in some embodiments, the processor 202 and/or the recognizer module 212 may include speech repair circuitry to modify unclear speech signal inputs based on contextual hints. For example, a speech signal input provided by a user confirming a pick-up location (e.g., a shelf number) in a warehouse may be identified as "eighty (80)," by the microphone 102, the recognizer module 212, and/or the processor 202. However, the recognizer module 212, and/or the processor 202 may know (e.g., via system inputs or other parameters) that there are a maximum of twenty (20) shelves in the warehouse. Thus, the recognizer module 212 and/or the processor 202, may overwrite the speech signal input as "eighteen (18)" based upon the context of the input. Therefore, the recognizer module 212 and/or the processor 202, may monitor and calculate a number of times modifications are made to speech signal inputs as a vocabulary assistance parameter (e.g., ParamHINT).

As described above, the vocabulary assistance parameter may refer to an average score, measurement, or similar qualification of a microphone's use of matched similar vocabulary (e.g., hint, speech recognition assistance, word approximation, or the like) with a speech signal input provided by a user. In some embodiments, the recognizer module 212 and/or the processor 202 may count a number of speech signal inputs received, a number of times a modification is made to a speech signal input based on vocabulary approximation and/or contextual data, and may divide these values to calculate a vocabulary assistance parameter (e.g., ParamHINT). In some embodiments, the vocabulary assistance parameter may operate as a hint to the recognizer module (e.g., recognizer module 212 in FIG. 2) of an expected response from an operator to assist the recognizer module in preventing recognition errors. For example, when a task dialog (e.g., workflow or the like) enters a node in a vocabulary task map associated with a response expression (e.g. required input to exit the node), the device may evaluate the response expression to determine an expected response. If, when the operator speaks (e.g., a speech signal input), the recognizer module output matches the expected response, the recognizer module may adjust the vocabulary assistance threshold in order to make it more likely that the words will be accepted. As described, this process may prevent words in the expected response from being incorrectly rejected by the systems described herein.

The adjustable microphone headset 100 may include means, such as the processor 202 and/or recognizer module 212, for testing the vocabulary assistance parameter with a vocabulary assistance parameter threshold at Block 506. As described above, a vocabulary assistance parameter threshold may refer to acceptable vocabulary assistance score for speech signals received and recognized by the microphone 102. Further, a vocabulary assistance parameter threshold may be, in some embodiments, a user defined acceptable value, and in other embodiments may be set by a system administrator or programming specification. In some embodiments, the microphone 102 may employ a trainable classifier or machine learning model to improve future determinations of a vocabulary assistance parameter threshold. For example, a vocabulary assistance parameter threshold may be set to a specific value (e.g., five (5) instances of vocabulary assistance) by a user, a system administrator, or programming specification. In such an example, the acceptable vocabulary assistance score range (e.g., vocabulary assistance parameter threshold), a maximum number of times vocabulary approximation may be used, for speech signal inputs received by the microphone 102 and/or the processor 202 may be five (5) instances of vocabulary assistance. Therefore, as described hereinafter, a pass state may be determined when five (5) or less instances of vocabulary assistance are need to correctly match a speech signal input with a desired output. In some embodiments, the vocabulary assistance parameter threshold may be predetermined and accessible to the processor 202 and/or the recognizer module 212.

Further, the adjustable microphone headset 100 may determine if the vocabulary assistance parameter is greater than the vocabulary assistance parameter threshold at Block 508. If the vocabulary assistance parameter is less than the vocabulary assistance threshold at Block 508, the adjustable microphone headset 100 may include means, such as the processor 202 and/or stepper motor, for maintaining the microphone at the first position at Block 510. In some embodiments, the microphone 102 may be maintained at the first position by maintaining an angular position of the microphone 102. Alternatively, if the vocabulary assistance parameter is greater than the vocabulary assistance threshold at Block 508, the adjustable microphone headset 100 may include means, such as the processor 202 or the like, for calculating a second position for the microphone at Block 512. As described above, in some embodiments, a sensor, such as a radial position sensor, a gyroscope, an accelerometer, or the like, may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position, defined by parameters such as height, angular rotation, tilt, yaw, and the like, of the microphone boom 104, and may compare it to a current position of the microphone boom 104 (e.g., a first position), as identified by a radial position sensor, a gyroscope, or the like. Further, the processor 202 or the like, may calculate a second position based on a difference between the ideal second position and the current position. In some embodiments, the second position may be defined in terms of three-dimensional coordinates corresponding to a desired position of the microphone boom 104. In other embodiments, the processor 202 may access a stored predetermined value of a second position of the microphone 102 based on a prior training and/or calibration.

The adjustable microphone headset 100 may include means, such as the processor 202 and/or stepper motor, for causing the microphone to move from the first position to the second position at Block 514. As described above, the stepper motor may be operatively connected to the microphone boom 104 and may receive an electrical signal corresponding to the second position of the microphone 102. The stepper motor may convert the second position to rotary steps of the stepper motor which may cause the microphone boom 104 to pivot upwards or downwards from the first position to the second position.

The following pseudo-code illustrates an example of the method 500 as shown in FIG. 5.

```
REFERENCE_HASHMAP{Key : Value} = { ParamHINT : refTHRESHOLD,... }
BEGIN:
    CURRENT_ParamHINT =
GET_CURENT_ParamHINT_FROM_RECONITION_HINT_MODULE( )
    IF: CURRENT_ParamHINT > REFERENCE_HASHMAP(value(ParamHINT))
        IF: CURRENT_MICROPHONE_POSITION ==
GET_STORED_MICROPHONE_POSITION_ORIENTATION( )
            NO_CHANGE_IN_MICROPHONE_POSITION
        ELSE:
            NEW_POSITION =
CALCULATE_NEW_POSITION_FOR_MICROPHONE(CURRENT_MICROPHONE_POSITION)
    SEND_INSTRUCTION_TO_CHANGE_POSITION_IN_HEADSET_MODULE(NEW_POSITION)
    ELSE:
        NO_CHANGE_IN_MICROPHONE_POSITION
END:
```

Figure 6:
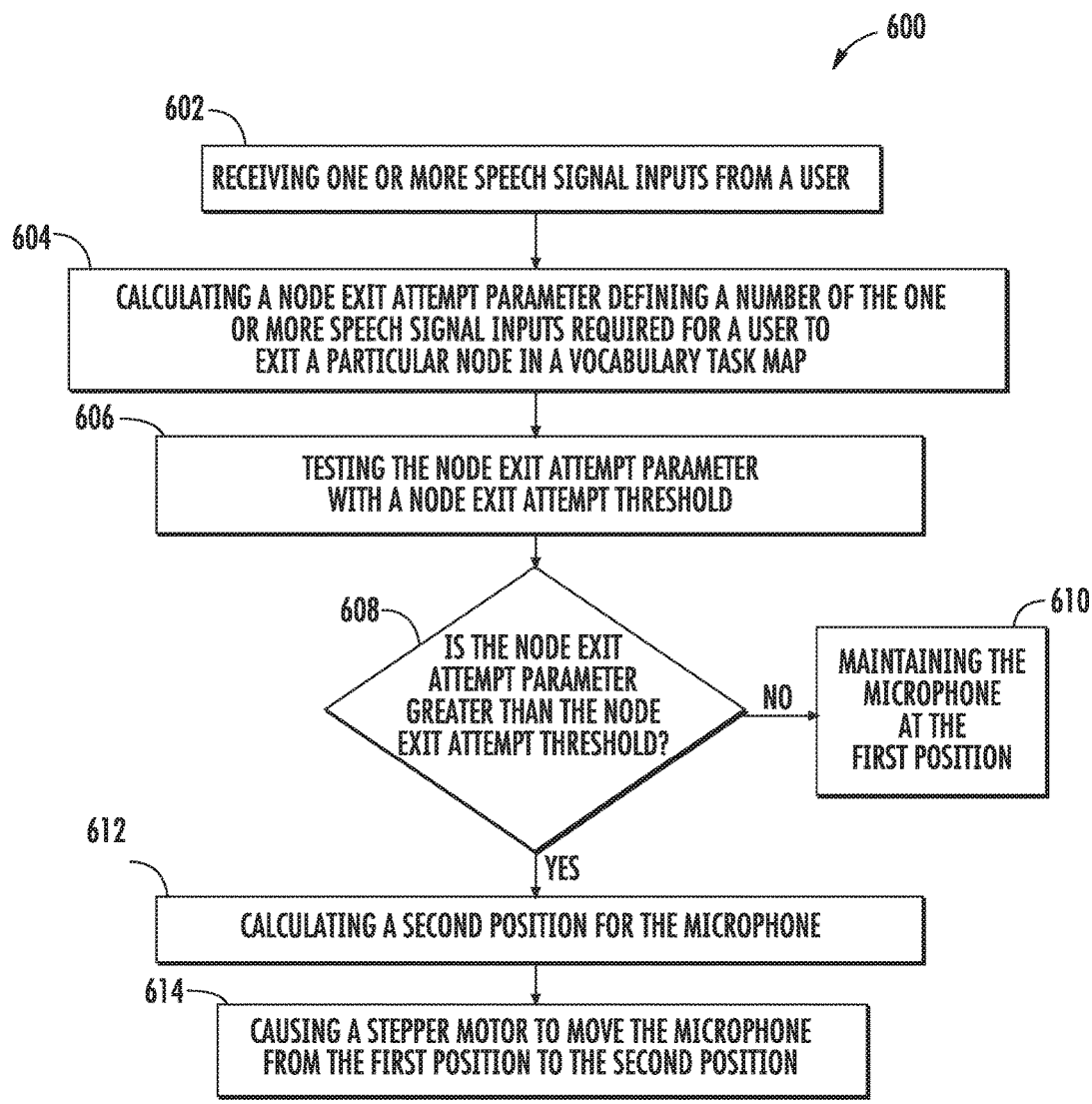
FIG. 6 shows a flowchart illustrating operations for determining a node exit attempt parameter, such as by the computing device of FIG. 2, in accordance with an example embodiment of the present disclosure.

With reference to FIG. 6, a method 600 for determining a node exit attempt parameter is shown. The adjustable microphone headset 100 may include means, such as the processor 202 or microphone 102, for receiving one or more speech signal inputs from a user at Block 602. As described above, the speech signal inputs received from the user may relate to a command and/or query related to a task in a workflow solution. The adjustable microphone headset 100 may further include means, such as the processor 202 and/or workflow iterator module 210, for calculating a node exit attempt parameter defining a number of the one or more speech signal inputs required for a user to exit a particular node in a vocabulary task map at Block 604. As described above with reference to FIG. 2, a workflow solution may include a vocabulary task map having one or more nodes and/or branches such that each node of the vocabulary task map may be associated with a task within a workflow. On completion of the work related task specific to a node, a user may have to provide a task completion notification, such as an audio command, to a workflow management system to exit the node and move to a subsequent node. Said another way, each node in the vocabulary task map may be associated with an exit command and/or vocabulary. Further, when the microphone 102 is incorrectly positioned, a speech signal input received from a user for exiting a node in the vocabulary task map may not be recognizable. Therefore, the user may be required to repeat the speech signal input multiple times. The workflow iterator module 210 and/or the processor 202 may calculate a number of attempts made by the user to exit a particular node in the vocabulary task map, as the node exit attempt parameter (e.g., ParamDE).

In some embodiments, the workflow iterator module 210 and/or the processor 202 may count a number of times a speech signal input is provided to exit a particular node in a vocabulary task map, a number of times the speech signal input is correctly recognized as a node exit command, and divide these values to determine a node exit parameter (e.g., ParamDE). In some other embodiments, the workflow iterator module 210 and/or the processor 202 may track a time required to recognize a speech signal input as a node exit command, and determine a node exit parameter based on the time taken to match a speech signal input to a node exit command associated with a particular node in a vocabulary task map. For example, the workflow iterator module 210 and/or the processor 202 may refer to a predetermined look-up table to determine a node exit parameter associated with a time taken to correctly match a speech signal input to a node exit command by the workflow iterator module 210 and/or the processor 202.

The adjustable microphone headset 100 may include means, such as the processor 202, workflow iterator module 210, and/or recognizer module 212, for testing the node exit attempt parameter with a node exit attempt threshold at Block 606. The node exit attempt parameter threshold may refer to an acceptable value for the amount of times required before a speech signal input is correctly interpreted such that movement from a current node to a subsequent node in a particular vocabulary task map may be allowed. The node exit attempt threshold may be specific to a particular node or may be defined for all nodes of a vocabulary task map. For example, for a node where a "Yes/No" input may be needed from a user to exit the node, a node exit parameter threshold may be set to a lower value (e.g., node exit attempt threshold) than a node exit attempt threshold for a node where a pick-up location confirmation may be needed from a user to exit the node (e.g., due to the larger amount of potentially incorrect inputs). In some embodiments, the workflow iterator module 210 and/or the processor 202 may track a change in node exit parameter and may define a node exit parameter threshold as an acceptable range of change in the node exit parameter. Further, a node exit parameter threshold may be, in some embodiments, a user defined acceptable value, and in other embodiments may be set by a system administrator or programming specification. In some embodiments, the microphone 102 may employ a trainable classifier or machine learning model to improve future determinations of a node exit parameter threshold.

Further, the adjustable microphone headset 100 may include means, such as the processor 202 and/or recognizer module 212, for determining if the node exit attempt parameter is greater than the node exit attempt threshold at Block 608. If the node exit attempt parameter is less than the node exit attempt threshold at Block 608, the adjustable microphone headset 100 may include means, such as the processor 202 and/or stepper motor, for maintaining the microphone at the first position at Block 610. In some cases, the node exit parameter may be determined, via the processor 202, to be lesser than a node exit parameter threshold associated with a particular node in a vocabulary task map. For example, based on a current position of the microphone 102 (e.g., a first position), the processor 202 and/or the recognizer module 212, may not be able to match a speech signal input to a node exit command specific to a particular node correctly and/or readily. In such an instance, multiple speech signal inputs may be required before a speech signal input is correctly identified to exit a particular node. For example, a user may have to repeat a speech signal input multiple times in order to exit the particular node. In such a case, a node exit parameter (e.g., a number of attempts made to exit a particular node) may be compared to a node exit parameter threshold indicating the acceptable number of attempts associated with the particular node. Thus, if the node exit attempt parameter is greater than the node exit attempt threshold at Block 608 (e.g., the number of attempts exceed the node exit attempt parameter), the adjustable microphone headset 100 may include means, such as the processor 202 or the like, for calculating a second position for the microphone at Block 612. As described above, in some embodiments, a sensor (e.g., a radial position sensor, a gyroscope, an accelerometer, or the like) may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position defined by parameters such as height, angular rotation, tilt, yaw, and the like, of the microphone boom 104 and may compare it to a current position of the microphone boom 104 as identified by a radial position sensor, a gyroscope, or the like. Further, the processor 202 or the like, may calculate a second position based on a difference between the ideal second position and the current position (e.g., a first position). In some embodiments, the second position may be defined in terms of three-dimensional coordinates corresponding to a desired position of the microphone boom 104. In another embodiment, the processor 202 may determine a stored predetermined value of a second position of the microphone 102 based on a prior training and/or calibration.

The adjustable microphone headset 100 may include means, such as the processor 202 or the like, for causing a stepper motor to move the microphone from the first position to the second position at Block 614. As described above, the stepper motor may be operatively connected to the microphone boom 104 and may receive an electrical signal corresponding to the second position of the microphone 102. The stepper motor may convert the second position to rotary steps of the stepper motor and may cause the microphone boom 104 to pivot upwards or downwards to move the microphone from the first position to the second position.

The following pseudo-code illustrates an example of the method 600 as shown in FIG. 6.

include means, such as the processor 202 and/or microphone 102, for calculating an input gain parameter of the speech signal input at Block 704. As described above, an input gain parameter may refer to a measurement or similar qualification of an energy level or value (e.g., decibel gain) associated with a speech signal input received by the microphone 102. In some embodiments, the input gain parameter may include any physical parameter of the speech signal input, such as, but not limited to, wavelength, frequency, pitch, or the like. In some embodiments, the input gain parameter may be calculated by a gain circuitry within the housing 108 of the adjustment microphone headset 100. The gain circuitry may calculate a decibel gain of the speech signal input received at the microphone 102.

The adjustable microphone headset 100 may further include means, such as the processor 202, for testing the input gain parameter with minimum and maximum input gain thresholds at Block 706. In some embodiments, the minimum and maximum input gain thresholds may refer to an acceptable energy level or input gain for speech signal inputs received and recognized by the microphone 102. In some cases, the input gain parameter may be less than a minimum input gain threshold such that the speech signal may not be recognizable by the processor 202 and/or the microphone 102. In other cases, the input gain parameter may be greater than a maximum input gain threshold such that the speech signal input may not be recognizable by the processor 202 and/or microphone 102. By way of example, in some cases, the microphone 102 may be positioned too close to the mouth of a user such that the speech signals inputted by the user are unrecognizable (e.g., too loud).

The adjustable microphone headset 100 may include means, such as the processor 202, for testing the input gain parameter with minimum and maximum input gain thresholds at Block 708. If the input gain parameter is determined to be greater than the minimum input gain threshold and less than the maximum input gain threshold at Block 708, the adjustable microphone headset 100 may include means, such as the processor 202 and/or stepper motor, for maintaining the microphone at the first position at Block 710. If the input gain parameter is determined to be less than the minimum input gain threshold and/or greater than the maxi-

```
REFERENCE_HASHMAP{Key : Value} = { ParamDE : refTHRESHOLD,... }
BEGIN:
      CURRENT_ParamDE = GET_CURENT_ParamDE_FROM_DIALOG_ENGINE_MODULE( )
      IF: CURRENT_ParamDE > REFERENCE_HASHMAP(value(ParamDE))
            IF: CURRENT_MICROPHONE_POSITION ==
GET_STORED_MICROPHONE_POSITION_ORIENTATION( )
                  NO_CHANGE_IN_MICROPHONE_POSITION
            ELSE:
                  NEW_POSITION =
CALCULATE_NEW_POSITION_FOR_MICROPHONE(CURRENT_MICROPHONE_POSITION)
      SEND_INSTRUCTION_TO_CHANGE_POSITION_IN_HEADSET_MODULE(NEW_POSITION)
      ELSE:
            NO_CHANGE_IN_MICROPHONE_POSITION
END:
```

Figure 7:
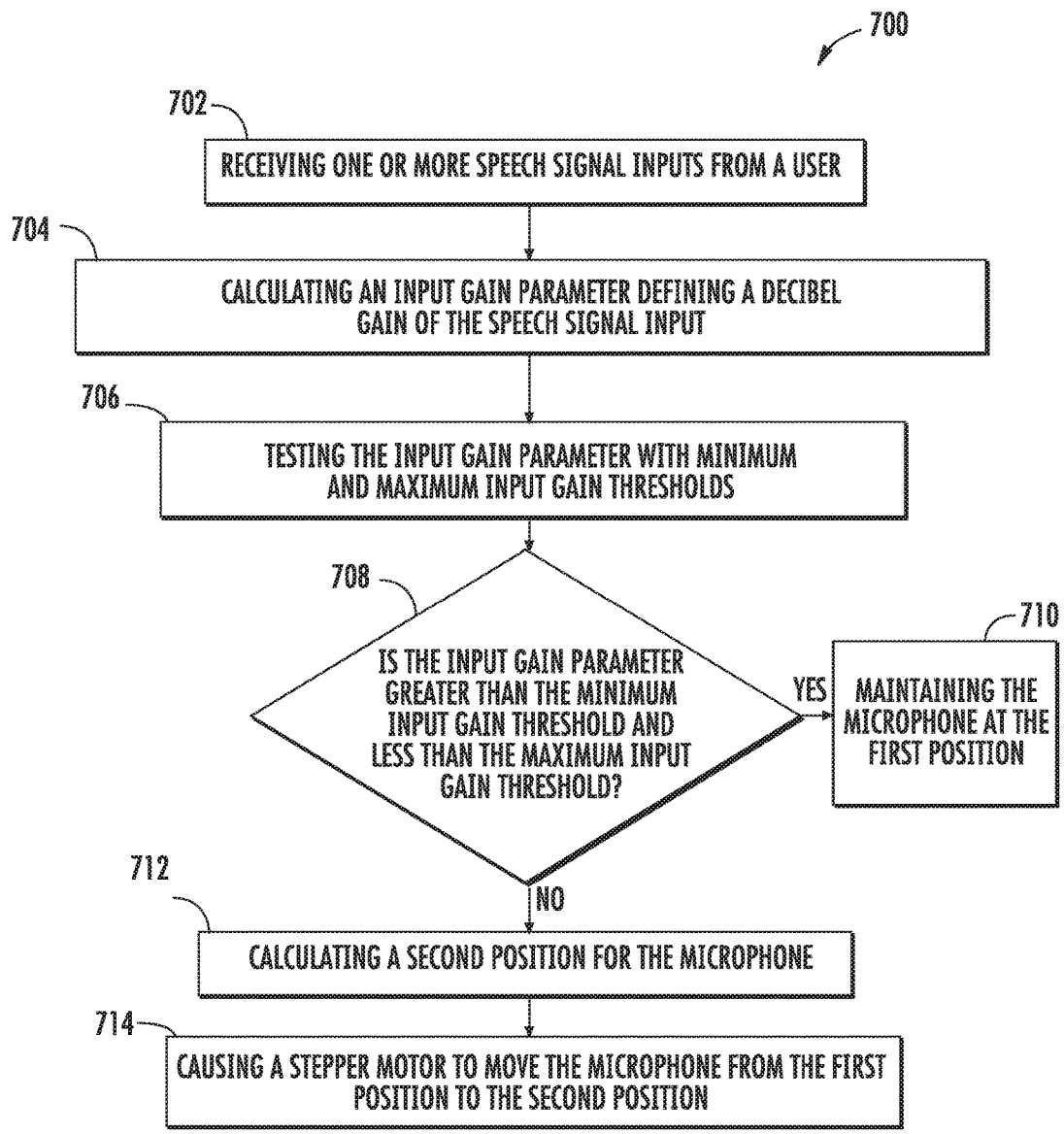
FIG. 7 shows a flowchart illustrating operations for determining an input gain parameter, such as by the computing device of FIG. 2, in accordance with an example embodiment of the present disclosure.

With reference to FIG. 7, a method 700 for determining an input gain parameter is shown. The adjustable microphone headset 100 may include means, such as the processor 202 or microphone 102, for receiving one or more speech signal inputs a user at Block 702. The speech signal inputs (e.g., sound emission, word command, utterance, or the like) received by the microphone from the user. In some embodiments, the speech signal input received from a user relates to a command and/or query related to a task in a workflow solution. The adjustable microphone headset 100 may mum input gain threshold at Block 708, the adjustable microphone headset 100 may include means, such as the processor 202 or the like, for calculating a second position for the microphone at Block 712. As described above, in some embodiments, a sensor (e.g., a radial position sensor, a gyroscope, an accelerometer, or the like) may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position defined by parameters such as height, angular rotation, tilt, yaw, and the like, of the microphone boom 104 and may compare it to a current position of the microphone boom 104 as identified by a radial position sensor, a gyroscope, or the like. Further, the processor 202 or the like, may calculate a second position based on a difference between the ideal second position and the current position (e.g., a first position). In some embodiments, the second position may be defined in terms of three-dimensional coordinates corresponding to a desired position of the microphone boom 104. In other embodiments, the processor 202 may determine a stored predetermined value of a second position of the microphone 102 based on a prior training and/or calibration.

The adjustable microphone headset 100 may include means, such as the processor 202 or the like, for causing a stepper motor to move the microphone from the first position to the second position at Block 714. As described above, the stepper motor may be operatively connected to the microphone boom 104 and may receive an electrical signal corresponding to the second position of the microphone 102. The stepper motor may convert the second position to rotary steps of the stepper motor and may cause the microphone boom 104 to pivot upwards or downwards to move the microphone 102 from the first position to the second position.

Figure 8:
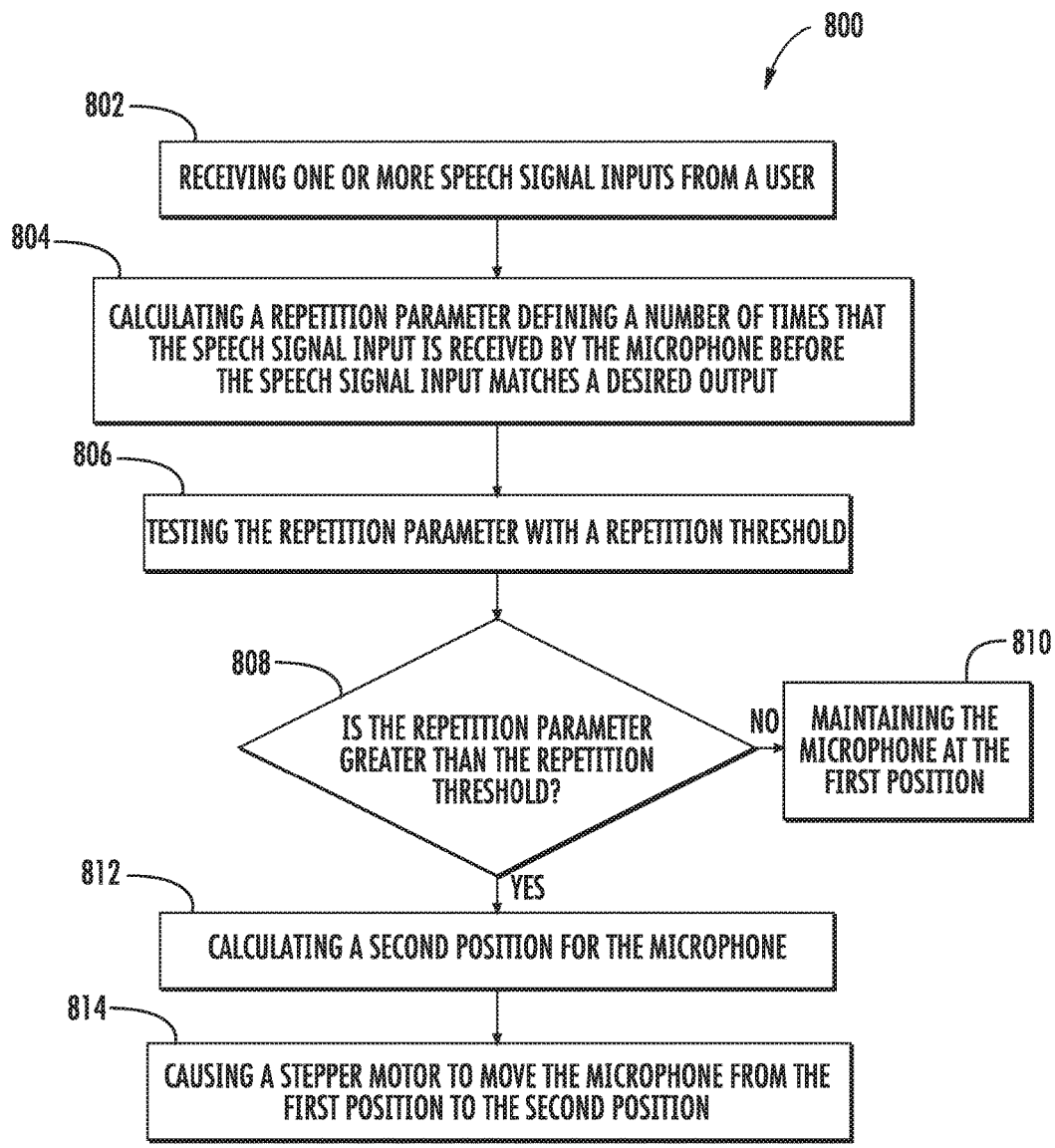
FIG. 8 shows a flowchart illustrating operations for determining a repetition parameter, such as by the computing device of FIG. 2, in accordance with an example embodiment of the present disclosure.

With reference to FIG. 8, a method 800 for determining a repetition parameter is shown. The adjustable microphone headset 100 may include means, such as the processor 202 or microphone 102, for receiving one or more speech signal inputs from a user at Block 802. As described above, the speech signal input received from a user may relate to a command and/or query related to a task in a workflow solution. The adjustable microphone headset 100 may include means, such as the processor 202, for calculating a repetition parameter defining a number of times that the speech signal input is received by the microphone before the speech signal input matches a desired output at Block 804. As described above, with reference to FIG. 2, the recognizer module 212 and/or the processor 202 may include a speech processing circuitry for recognizing, parsing, and/or synthesizing the speech signal inputs. The processed speech signal inputs may be compared to a stored vocabulary and/or dictionary to decode and match the speech signal input to a desired output. However, in some cases when the microphone 102 is not correctly positioned, a speech signal input received from a user may not be clearly recognized (e.g., by the microphone 102 for example). In such a case, the processor 202 and/or the recognizer module 212 may not be able to readily match the speech signal input to a desired output.

The adjustable microphone headset 100 may include means, such as the processor 202 and/or recognizer module 212, for testing the repetition parameter with a repetition threshold at Block 806. In some embodiments, the repetition threshold may be predetermined and accessible by the processor 202 and/or the recognizer module 212. The adjustable microphone headset 100 may include means, such as the processor 202 and/or recognizer module 212, for determining if the repetition parameter is greater than a repetition threshold at Block 808.

If the repetition parameter is determined to be less than the repetition threshold at Block 808, the adjustable microphone headset 100 may include means, such as the processor 202 and/or stepper motor, for maintaining the microphone at the first position at Block 810. If the repetition parameter is determined to be greater than the repetition threshold at Block 808, the adjustable microphone headset 100 may include means, such as the processor 202 or the like, for calculating a second position for the microphone at Block 812. As described above, in an exemplary embodiment, a sensor (e.g., a radial position sensor, a gyroscope, an accelerometer, or the like) may calculate a second position of the microphone 102 in degrees and/or radians. In some embodiments, the second position may be defined as an adjustment in a height, angular rotation, tilt, yaw, and the like, of the microphone 102 and/or the microphone boom 104. For example, the processor 202 or the like, may refer to an ideal second position defined by parameters such as height, angular rotation, tilt, yaw, and the like, of the microphone boom 104 and may compare it to a current position of the microphone boom 104 as identified by a radial position sensor, a gyroscope, or the like. Further, the processor 202 or the like, may calculate a second position based on a difference between the ideal second position and the current position (e.g., a first position). In some embodiments, the second position may be defined in terms of three-dimensional coordinates corresponding to a desired position of the microphone boom 104. In other embodiments, the processor 202 may determine a stored predetermined value of a second position of the microphone 102 based on a prior training and/or calibration.

The adjustable microphone headset 100 may include means, such as the processor 202 or the like, for causing a stepper motor to move the microphone from the first position to the second position at Block 814. As described above, the stepper motor may be operatively connected to the microphone boom 104 and may receive an electrical signal corresponding to the second position of the microphone 102. The stepper motor may convert the second position to rotary steps of the stepper motor and may cause the microphone boom 104 to pivot upwards or downwards causing the microphone 102 to move from the first position to the second position relative to a user.

FIGS. 3 through 8 illustrate example flowcharts of the operations performed by an apparatus, such as by the computing device 200 of FIGS. 1-2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 through 8, when executed, convert a computer or processing circuitry into a particular machine configured to perform an example embodiment of the present invention. Accordingly, the operations of FIGS. 3 through 8 define an algorithm for configuring a computer or processor, to perform an example embodiment. In some cases, a general purpose computer may be provided with an instance of the processor which performs the algorithm of FIGS. 3 through 8 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "further," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof if implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for adjusting an orientation of a headset, the method comprising:
   detecting a microphone attached to the headset at a first position relative to a user;
   receiving, by the microphone, a speech signal input from a user in the form of an utterance;
   calculating, by a computing device, in response to the speech signal input, a feedback parameter wherein the feedback parameter comprises a confidence parameter defining an average recognition score of the speech signal input that match a desired output, a vocabulary assistance parameter defining a number of times that the one or more speech signal input is recognized due to vocabulary approximation, and a node exit attempt parameter defining a number of speech signal inputs required for a user to exit a particular node in a vocabulary task map;
   determining, by the computing device, a pass state in an instance in which the feedback parameter satisfies a feedback threshold, to maintain the microphone at the first position; and
   determining, by the computing device, a fail state in an instance in which the feedback parameter fails to satisfy a feedback threshold, to cause a stepper motor to move the microphone from the first position to a second position relative to the user.

2. The method according to claim 1, wherein determining, by the computing device, the fail state further comprises testing that at least one of:
   the confidence parameter is less than a confidence threshold;
   the vocabulary assistance parameter is greater than a vocabulary assistance threshold; or
   the node exit attempt parameter is greater than a node exit attempt threshold.

3. The method according to claim 1, further comprising:
   generating, by the microphone, in response to receiving the speech signal input, an input gain parameter defining a decibel gain of the speech signal input;
   determining, by the computing device, the pass state in an instance in which the input gain parameter is greater than a minimum input gain threshold or less than a maximum input gain threshold, to maintain the microphone at the first position; and
   determining, by the computing device, the fail state in an instance in which the input gain parameter is less than a minimum input gain threshold or greater than a maximum input gain threshold, to cause the stepper motor to move the microphone from the first position to the second position.

4. The method according to claim 1, further comprising:
   generating, by the computing device, in response to receiving the speech signal input, a repetition parameter defining a number of times that the speech signal input is received by the microphone before the speech signal input matches a desired output;
   determining, by the computing device, the pass state in an instance in which the repetition parameter is less than a repetition threshold, to maintain the microphone at the first position; and
   determining, by the computing device, the fail state in an instance in which the repetition parameter is greater than a repetition threshold, to cause the stepper motor to move the microphone from the first position to the second position.

5. The method according to claim 1, further comprising:
   detecting, by a gyroscope, a first angular position of the microphone;
   determining, by the computing device, the pass state in an instance in which the feedback parameter satisfies a feedback threshold, to maintain the microphone at the first angular position; and
   determining, by the computing device, the fail state in an instance in which the feedback parameter fails to satisfy a feedback threshold, to cause a stepper motor to move the microphone from the first angular position to the second angular position.

6. The method according to claim 1, further comprising causing the microphone to move to a third position relative to the user, via the stepper motor, in an instance in which the speech signal input from the user is determined to further comprise user status change data.

7. The method according to claim 1, further comprising calibrating the headset such that the feedback parameter further comprises user-specific feedback data.

8. An adjustable headset comprising:
   a microphone located at a first position, wherein the microphone is configured to receive a speech signal input from a user in the form of an utterance;
   a computing device, wherein the computing device is configured to:
      determine a pass state or a fail state of the first position of the microphone, based upon a comparison of a feedback parameter with a feedback threshold, and, if a fail state is determined, to calculate a second position of the microphone;
      determine a feedback parameter, in response to the speech signal input, wherein the feedback parameter comprises a confidence parameter defining an average recognition score of the speech signal input that matches a desired output and a vocabulary assistance parameter defining a number of times that the speech signal input is recognized due to vocabulary approximation;
      modify the feedback parameter, in response to the speech signal input, to further comprise a node exit attempt parameter defining a number of attempts required for a user to exit a particular node in a vocabulary task map; and
   a stepper motor configured to move the microphone from the first position to the second position.

9. The adjustable headset according to claim 8, wherein the computing device determines the fail state in an instance in which:
   the confidence parameter is less than a confidence threshold;
   the vocabulary assistance parameter is greater than a vocabulary assistance threshold; or
   the node exit attempt parameter is greater than a node exit attempt threshold.

10. The adjustable headset according to claim 8, wherein the computing device is further configured to:
   modify the feedback parameter with an input gain parameter defining a decibel gain of the speech signal input
   determine the pass state in an instance in which the input gain parameter is greater than a minimum input gain threshold or less than a maximum input gain threshold, to maintain the microphone at the first position; and
   the stepper motor is configured to move the microphone from the first position to the second position in an instance in which the fail state is determined, by the computing device, by testing that the input gain parameter is less than a minimum input gain threshold or greater than a maximum input gain threshold.

11. The adjustable headset according to claim 8, wherein the computing device is further configured to:
modify the feedback parameter with a repetition parameter defining a number of times that the speech signal input is received by the microphone before the speech signal input matches a desired output, and wherein the stepper motor is configured to:
maintain the microphone at the first angular position in an instance in which the pass state is determined, by the computing device, in which the repetition parameter satisfies a repetition threshold; and
move the microphone from the first position to the second position in an instance in which the fail state is determined, by the computing device, in which the repetition parameter is greater than the repetition threshold.

12. The adjustable headset according to claim 8, further comprising:
a gyroscope configured to determine a first angular position of the microphone, wherein the stepper motor is configured to:
maintain the microphone at the first angular position in an instance in which the pass state is determined, by the computing device, in which the feedback parameter satisfies the feedback threshold; and
move the microphone from the first angular position to the second angular position in an instance in which the fail state is determined, by the computing device, in which the feedback parameter fails to satisfy the feedback threshold.

13. The adjustable headset according to claim 8, wherein the stepper motor is further configured to move the microphone from the first position to a third position in an instance in which the speech signal input from the user is determined to further comprise user status change data.

14. The adjustable headset according to claim 8, further comprising user-specific feedback data generated by the computing device during a calibration procedure.

15. A computer program product comprising at least one non-transitory computer-readable storage medium having computer-executable program code stored therein, the computer-executable program code comprising program code instructions configured to:
detect a microphone at a first position;
receive a speech signal input from a user in the form of an utterance;
determine, in response to the speech signal input, a feedback parameter, wherein the feedback parameter comprises:
a confidence parameter defining an average recognition score of the speech signal input that match a desired output,
a vocabulary assistance parameter defining a number of times that the speech signal input is recognized due to vocabulary approximation, and
a node exit attempt parameter defining a number of attempts required for a user to exit a particular node in a vocabulary task map;
determine a pass state in an instance in which the feedback parameter satisfies a feedback threshold, to maintain the microphone at the first position; and
determine a fail state in an instance in which the feedback parameter fails to satisfy a feedback threshold, to cause a stepper motor to move the microphone from the first position to a second position.

16. The computer program product according to claim 15, further comprising program code instructions configured to determine the fail state in an instance in which at least one of:
the confidence parameter is less than a confidence threshold;
the vocabulary assistance parameter is greater than a vocabulary assistance threshold; or
the node exit attempt parameter is greater than the node exit attempt threshold.

17. The computer program product according to claim 15, further comprising program code instructions configured to:
generate, in response to receiving the speech signal input, an input gain parameter defining a decibel gain of the speech signal input;
determine, the pass state in an instance in which the input gain parameter is greater than a minimum input gain threshold or less than a maximum input gain threshold, to maintain the microphone at the first position; and
determine the fail state in an instance in which the input gain parameter is less than a minimum input gain threshold or greater than a maximum input gain threshold, to cause the stepper motor to move the microphone from the first position to the second position.

18. The computer program product according to claim 15, further comprising program code instruction configured to:
generate, in response to receiving a speech signal input, a repetition parameter defining a number of times that the speech signal input is received by the microphone before the speech signal input matches a desired output;
determine, the pass state in an instance in which the repetition parameter is less than a repetition threshold, to maintain the microphone at the first position; and
determine the fail state in an instance in which the repetition parameter is greater than a repetition threshold, to cause the stepper motor to move the microphone from the first position to the second position.

19. The computer program product according to claim 15, further comprising program code instruction configured to:
detect a first angular position of the microphone;
determine the pass state in an instance in which the feedback parameter satisfies a feedback threshold, to maintain the microphone at the first angular position; and
determine the fail state in an instance in which the feedback parameter fails to satisfy a feedback threshold, to cause the stepper motor to move the microphone from the first angular position to the second angular position.

20. The computer program product according to claim 15, further comprising program code instruction configured to calibrate the headset such that the feedback parameter further comprises user-specific feedback data.

* * * * *